United States Patent
Varadarajan et al.

(10) Patent No.: US 11,200,253 B2
(45) Date of Patent: Dec. 14, 2021

(54) PROVIDING INSTANT AND DISTRIBUTED ACCESS TO A SOURCE BLOB VIA COPY-ON-READ BLOBS AND LINK BLOBS

(71) Applicant: Microsoft Technology Licensing, LLC, Redmond, WA (US)

(72) Inventors: Krishnan Varadarajan, Redmond, WA (US); Shane Mainali, Duvall, WA (US); Maneesh Sah, Sammamish, WA (US); Manan Shah, Bothell, WA (US); Andrew Edwards, Bellevue, WA (US); Ivan Brugiolo, Bellevue, WA (US); Ju Wang, Santa Clara, CA (US); Ovais Khan, Bothell, WA (US); Sivakumar Kalva, Kirkland, WA (US); Venkates P. Balakrishnan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 354 days.

(21) Appl. No.: 16/438,940

(22) Filed: Jun. 12, 2019

(65) Prior Publication Data

US 2019/0347272 A1    Nov. 14, 2019

Related U.S. Application Data

(63) Continuation of application No. 15/629,499, filed on Jun. 21, 2017, now Pat. No. 10,366,104.

(51) Int. Cl.
*G06F 16/27* (2019.01)
*G06F 16/22* (2019.01)
*G06F 16/188* (2019.01)

(52) U.S. Cl.
CPC ............ *G06F 16/27* (2019.01); *G06F 16/188* (2019.01); *G06F 16/2272* (2019.01)

(58) Field of Classification Search
CPC ..... G06F 16/27; G06F 16/2272; G06F 16/188
(Continued)

(56) References Cited

U.S. PATENT DOCUMENTS

| | | | |
|---|---|---|---|
| 2011/0196822 A1* | 8/2011 | Zunger | G06F 16/27 707/609 |
| 2011/0196900 A1* | 8/2011 | Drobychev | G06F 16/23 707/812 |

(Continued)

OTHER PUBLICATIONS

Daher, Zouheir, et al., "Cloud Storage Comparative Analysis Amazon Simple Storage vs. Microsoft Azure", Int'l Journal of Machine Learning and Computing, vol. 8, No. 1, Feb. 2018, pp. 85-89.*

(Continued)

*Primary Examiner* — Robert Stevens
(74) *Attorney, Agent, or Firm* — Fiala & Weaver P.L.L.C.

(57) ABSTRACT

Methods, systems, apparatuses, and computer program products are provided that enable immediate access to data associated with a source blob. The foregoing is achieved by creating a copy-on-read blob based on the source blob and a link blob based on the copy-on-read blob for each virtual machine to be deployed. When creating the copy-on-read blob, the source blob is not copied. Instead, data from the source blob is copied to the copy-on-read blob upon request by a virtual machine. Subsequent requests for that data are retrieved from the copy-on-read blob. Each link blob stores write data provided by its corresponding virtual machine. When a virtual machine requests data, its corresponding link blob is checked for the data. If the data is not stored therein, the copy-on-read blob is checked for the data. If the copy-on-read blob does not store the data, the data is retrieved from the source blob.

20 Claims, 18 Drawing Sheets

(58) Field of Classification Search
USPC .......................................................... 707/634
See application file for complete search history.

(56) References Cited

U.S. PATENT DOCUMENTS

2012/0054197 A1* 3/2012 Martin .............. G06F 16/24554
707/747
2014/0304240 A1* 10/2014 Zunger .................... G06G 7/62
707/692

OTHER PUBLICATIONS

Muralidhar, Subramanian, et al., "f4: Facebook's Warm BLOB Storage System", Proc. of the 11th USENIX Symposium on Operating Systems Design and Implementation, Broomfield, CO, Oct. 6-8, 2014, pp. 383-398.*
San Lucas, César, et al., "Towards a fast multi-tier storage simulator", ETCM 2016, Guayaquil, Ecuador, Oct. 12-14, 2016, pp. 1-5.*

* cited by examiner

PROVIDING INSTANT AND DISTRIBUTED ACCESS TO A SOURCE BLOB VIA COPY-ON-READ BLOBS AND LINK BLOBS

CROSS REFERENCE TO RELATED APPLICATION

This application is a continuation of U.S. application Ser. No. 15/629,499, filed on Jun. 21, 2017, which is incorporated by reference herein in its entirety.

BACKGROUND

As an increasing number of applications and services are being made available over networks such as the Internet, an increasing number of content, application, and/or service providers are turning to technologies such as cloud computing. Cloud computing, in general, is an approach to provide access to resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

When a customer requires the services of a cloud-computing environment, any number of virtual machines may be provisioned to implement the services required by the customer. Each of the virtual machines are configured to run a particular operating system and/or one or more applications. The operating system and/or application(s) may be stored as a source blob (e.g., a source image) in a repository that includes a plurality of differently configured source blobs (e.g., each source blob may comprise a set of different operating systems and/or application(s) and/or versions thereof). In such a scenario, the source blob is typically copied (in its entirety) to the same one or more node(s) (e.g., server(s)) on which the virtual machine(s) are to be executed), and the virtual machine(s) begin normal operation (e.g., performing read and write requests of data included in the copy of the source blob) after the source blob is copied. However, copying the entire source blob can be a slow process, especially when the source blob is large in size (e.g., 30 GB). This disadvantageously delays the time in which the virtual machine(s) can be utilized. Moreover, copying the entire source blob to each of the node(s) consumes a considerable amount of storage resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein overcome the above-described deficiencies. For example, embodiments disclosed herein enable immediate access to data associated with a source blob, while still preserving storage resources. The foregoing may be achieved by creating a copy-on-read blob that is based on the source blob and a link blob that is based on the copy-on-read blob for each virtual machine to be deployed. Both the copy-on-read blob and the source blob are configured to be readable by the virtual machines, but are write-protected such that the virtual machines cannot write data thereto. The copy-on-read blob represents a copy of the source blob. When creating the copy-on-read blob, the source blob is not copied. Instead, data from the source blob is copied to the copy-on-read blob when it is requested by a virtual machine. Subsequent requests for that data are then retrieved from the copy-on-read blob, rather than the source blob. The link blobs are based on the copy-on-read blob. Each of the link blobs is configured to store write data provided by its corresponding virtual machine. The data stored by the link blob represents changes made to the source blob by the virtual machine. By creating a link blob for each virtual machine, each of the virtual machines are enabled to independently make changes to the data in a distributed fashion. When a virtual machine requests data, its corresponding link blob is checked to see if the requested data is stored therein. If the data is not stored therein, the copy-on-read blob is checked to see if the requested data is stored therein. If the copy-on-read blob does not store the data, the requested data is retrieved from the source blob. The foregoing techniques advantageously enable data associated with the base source blob to be immediately accessible without having to copy the source blob in its entirety, thereby enabling the virtual machines to begin normal operation in a much quicker fashion and also conserving storage resources.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
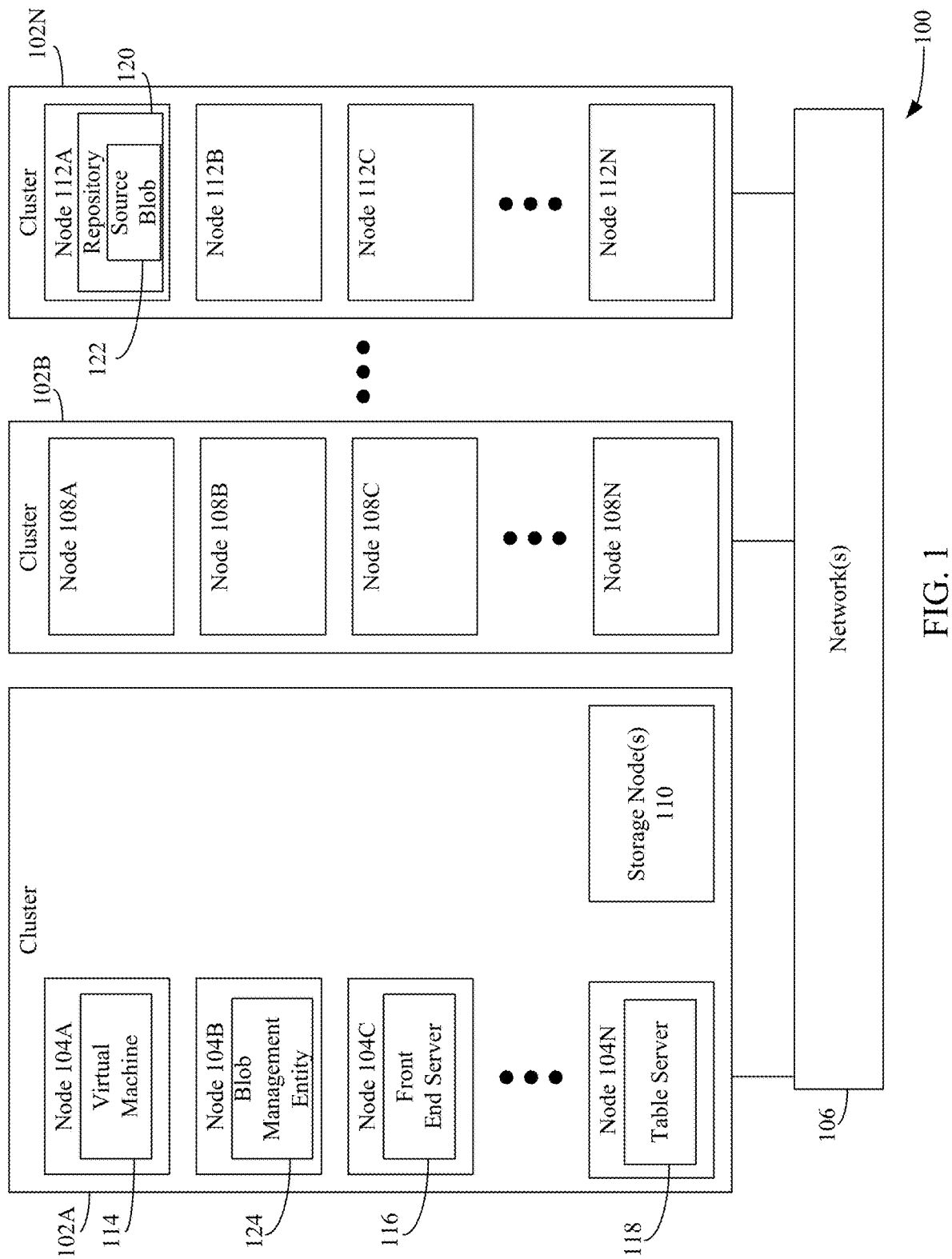
FIG. 1 shows a block diagram of a storage system for providing instant access to a source blob maintained by a network-accessible server set, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Exemplary Embodiments

Embodiments disclosed herein enable immediate access to data associated with a source blob, while still preserving storage resources. The foregoing may be achieved by creating a copy-on-read blob that is based on the source blob and a link blob that is based on the copy-on-read blob for each virtual machine to be deployed. Both the copy-on-read blob and the source blob are configured to be readable by the virtual machines, but are write-protected such that the virtual machines cannot write data thereto. The copy-on-read blob represents a copy of the source blob. When creating the copy-on-read blob, the source blob is not copied. Instead, data from the source blob is copied to the copy-on-read blob when it is requested by a virtual machine. Subsequent requests for that data are then retrieved from the copy-on-read blob, rather than the source blob. The link blobs are based on the copy-on-read blob. Each of the link blobs is configured to store write data provided by its corresponding virtual machine. The data stored by the link blob represents changes made to the source blob by the virtual machine. By creating a link blob for each virtual machine, each of the virtual machines are enabled to independently make changes to the data in a distributed fashion. When a virtual machine requests data, its corresponding link blob is checked to see if the requested data is stored therein. If the data is not stored therein, the copy-on-read blob is checked to see if the requested data is stored therein. If the copy-on-read blob does not store the data, the requested data is retrieved from the source blob. The foregoing techniques advantageously enable data associated with the base source blob to be immediately accessible without having to copy the source blob in its entirety, thereby enabling the virtual machines to begin normal operation in a much quicker fashion and also conserving storage resources.

For instance, FIG. 1 shows a block diagram of a storage system 100 for providing instant access to a source blob maintained by a network-accessible server set, according to an example embodiment. As shown in FIG. 1, storage system 100 includes a plurality of clusters 102A, 102B and 102N. Each of clusters 102A, 102B and 102N may be communicatively connected to each other via one or more networks 106. Network(s) 106 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set. Each of clusters 102A, 102B and 102N may comprise a group of one or more nodes and/or a group of one or more storage nodes. For example, as shown in FIG. 1, cluster 102A includes nodes 104A-104N and one or more storage nodes 110, cluster 102B includes nodes 108A-108N, and cluster 102N includes nodes 112A-112N. Each of nodes 104A-104N, 108A-108N and/or 112A-112N are each accessible via network(s) 106 (e.g., in a "cloud-based" embodiment) to build, deploy, and manage applications and services. Each of storage node(s) 110 comprise a plurality of physical storage disks that are accessible via network(s) 106 and are configured to store data associated with the applications and services managed by nodes 104A-104N, 108A-108N, and/or 112A-112N.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 104A-104N, 108A-108N and 112A-112N may be configured to execute one or more software applications (or "applications") and/or manage hardware resources (e.g., processors, memory, etc.), which may be utilized by users (e.g., customers) of the network-accessible server set. Node(s) 104A-104N, 108A-108N and 112A-112N may also be configured for specific uses. For example, as shown in FIG. 1, node 104A is configured to execute a virtual machine 114, node 104B is configured to execute a blob management entity 124, node 104C is configured to execute a front end server 116 and node 104N is configured to execute a table server 118. It is noted that each of virtual machine 114, blob management entity 124, front end server 116 and table server 118 may be executing on the same node or same cluster or, alternatively, on a different node or different cluster. It is further noted that cluster 102B and/or cluster 102N may also include storage node(s) 110.

Blob management entity 124 may be configured to provide a copy request to create a copy-on-read blob responsive to determining that one or more virtual machines (e.g., virtual machine 114) are to be provisioned. Blob management entity 124 may be further configured to provide a copy request to create a link blob for each virtual machine to be provisioned. The copy-on-read blob may be based on a source blob 122 (e.g., a source image) comprising at least one of an operating system image and/or one or more applications to be utilized by the virtual machine(s). As shown in FIG. 1, source blob 122 may be stored in a repository 120 comprising a plurality of source blobs (not shown), each configured to comprise a particular operating system image and/or one or more applications. The source blob may be a read-only blob.

Front end server 116 may be configured to service the copy requests provided by blob management entity 124. When receiving a request to create a copy-on-read blob, front end server 116 may cause table server 118 to create and maintain an index that represents the same number of logical units (e.g., an address or address range) of which source blob 122 comprises. For each logical unit of the index, the index identifies whether data is to be retrieved from source blob 122 or a physical storage location (e.g., a location within a physical storage disk maintained by storage node(s) 110) associated with the copy-on-read blob. When receiving a copy request to create a link blob, front end server 116 may cause table server 118 to create and maintain an index that represents the same number of logical units of which the copy-on-read blob and source blob 122 comprise. For each logical unit of the index, the index identifies whether or not data has been mapped to a physical storage location associated with the link blob. Upon creating the index associated with the copy-on-read blob and the index associated with the link blob, the data stored by source blob 120 is immediately-accessible by virtual machine 112.

Front end server 116 may be further configured to service read and write requests provided by virtual machine 114. FIGS. 2-9 are block diagrams of a storage system 200 illustrating the handling of copy requests, read requests and write requests by front end server 116 and table server 118.

Figure 2:
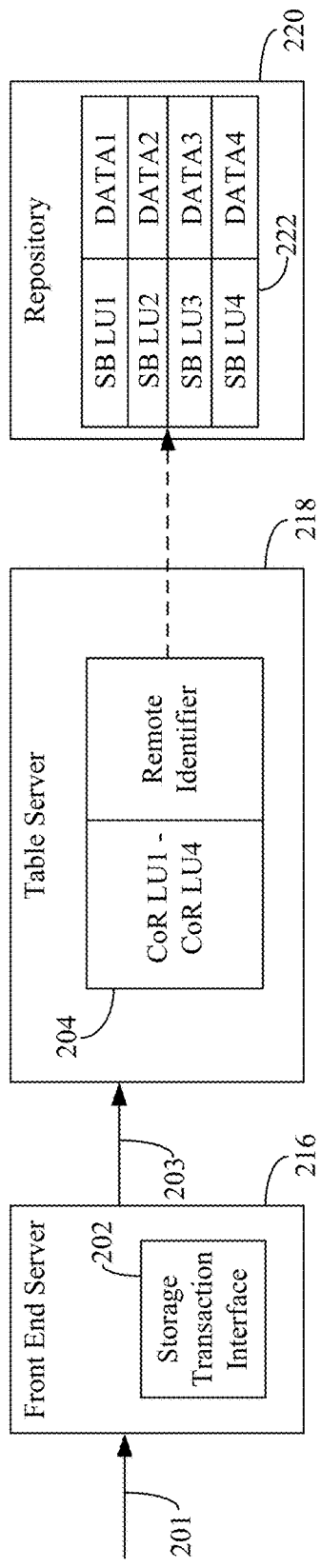
FIG. 2 is a block diagram of a storage system illustrating the creation of an index for a copy-on-read blob, according to an example embodiment.

FIG. 2 is a block diagram of a storage system 200 illustrating the creation of an index for a copy-on-read blob in accordance with an embodiment. As shown in FIG. 2, storage system 200 includes a front end server 216, table server 218 and a repository 220, each of which are examples of front end server 116, table server 118 and repository 120, as described above with reference to FIG. 1. As shown in FIG. 2, repository 220 includes a source blob 222. Source blob 222 is an example of source blob 122, as shown in FIG. 1. Source blob 222 comprises data (i.e., DATA1, DATA2, DATA3 and DATA4), which may be representative of an operating system image and/or one or more applications. Each of DATA1, DATA2, DATA3 and DATA4 are located at a particular logical unit (LU) associated with source blob (SB) 222. For example, DATA1 is located at SB LU1, DATA2 is located at SB LU2, DATA3 is located at SB LU3 and DATA4 is located at SB LU4. Each of SB LU1, SB LU2, SB LU3 and SB LU4 may represent a particular address or an address range at which data of source blob 222 is located. It is noted that while source blob 222 is shown to have DATA1-DATA4 located at SB LU1-SB LU4, respectively, source blob 222 may comprise any amount of data located at any number of logical units.

Front end server 216 may expose a storage transaction interface 202 via which blob management entity 124 (as shown in FIG. 1) provides copy requests and via which a virtual machine 114 (as shown in FIG. 1) provides read and write requests. In accordance with an embodiment, storage transaction interface 202 is an application programming interface (API).

As shown in FIG. 2, front end server 216 receives, via storage transaction interface 202, a copy request 201 to create a copy-on-read (CoR) blob. Responsive to receiving copy request 201, front end server 216 provides a command 203 to table server 218 that causes table server 218 to create an index 204 for the copy-on-read blob based on source blob 222. For example, index 204 may have one or more entries corresponding to each logical unit or range of logical units at which source blob data is located (i.e., SB LU1-SB LU4). In the example shown in FIG. 1, index 204 includes an entry representing a range of logical units (i.e., CoR LU1-CoR LU4) that corresponds to SB LU1-SB LU4). In accordance with an embodiment, CoR LU1-CoR LU4 indirectly maps to SB LU1-SB LU4. For example, CoR LU1-CoR LU4 may be logical unit addresses that are mapped to SB LU1-SB LU4 using an address translation process. In accordance with another embodiment, CoR LU1-CoR LU4 directly map to SB LU1-SB LU4. For example, CoR LU1-CoR LU1 and SB LU1-SB LU4 and may correspond to the same logical unit addresses.

As explained above, when a read request is directed to a copy-on-read blob, the read data is retrieved either from source blob 222 or a physical storage location assigned to the copy-on-read blob if data from source blob 222 has already been copied thereto. Thus, index 204 identifies whether requested data is to be retrieved from source blob 222 or a physical storage location assigned to the copy-on-read blob for each of CoR LU1-CoR LU4. As shown in FIG. 2, no data has been copied to a physical storage location of the copy-on-read blob (i.e., no data has been read from source blob 222 and copied to a particular physical storage location associated with the copy-on-read blob). Thus, index 204 associates each of CoR LU1-CoR LU4 with a remote identifier, which specifies a location of the cluster and/or node on which repository 220 is located (e.g., node 112A of cluster 102N, as shown in FIG. 1). In accordance with an embodiment, the remote identifier is a uniform resource locator (URL) that identifies the cluster and/or node on which repository 220 is located.

Figure 3:
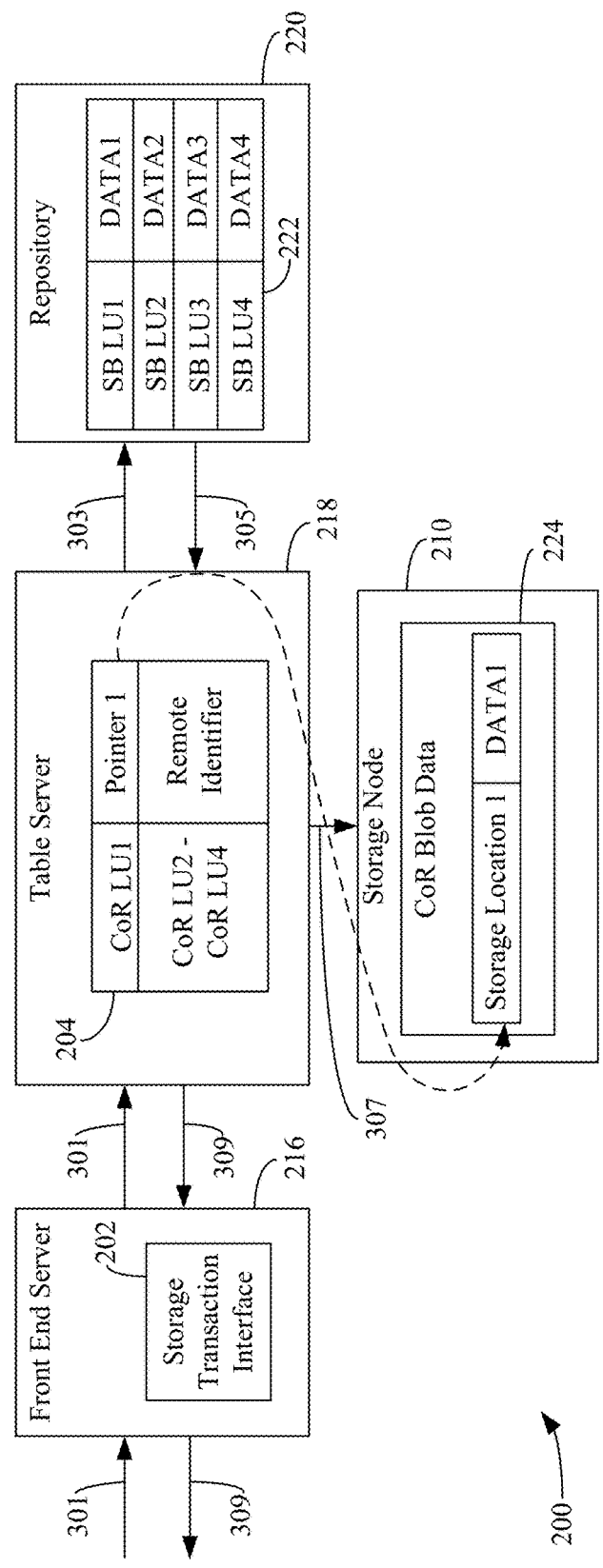
FIG. 3 is a block diagram of a storage system illustrating the handling of a read request directed to a copy-on-read blob, according to an example embodiment.

FIG. 3 is a block diagram of storage system 200 illustrating the handling of a read request directed to a copy-on-read blob in accordance with an embodiment. As shown in FIG. 3, front end server 216, via storage transaction interface 202, receives a read request 301 specifying one or more logical units from which data is to be retrieved. Read request 301 may be provided by a virtual machine (e.g., virtual machine 114, as shown in FIG. 1). Front end server 216 provides read request 301 to table server 218. In the example shown in FIG. 2, read request 301 specifies that data is to be retrieved from CoR LU1. Table server 218, using index 204, determines CoR LU1 is associated with the remote identifier (as shown in FIG. 2).

Using the remote identifier, table server 218 may send a read request 303 to the cluster and/or node on which source blob 222 is located. Read request 303 may specify logical unit(s) of source blob 222 corresponding to CoR LU1. In the example shown in FIG. 3, the logical unit corresponding to CoR LU1 is SB LU1. Thus, source blob 222 returns a response 305 including DATA1 to table server 218. Responsive to receiving response 305, table server 218 may copy DATA1 to a physical storage location (shown as Storage Location 1 in FIG. 3) assigned to the copy-on-read blob (shown as CoR blob data 224 in FIG. 3). Table server 218 may copy DATA1 via a write request 307 that specifies the physical storage location. As shown in FIG. 3, CoR blob data 224 is located on a storage node 210, which is an example of storage node 110, as shown in FIG. 1. Storage node 210 is included in the same cluster on which the virtual machine that provided read request 301 is executing. Thus, in this example, CoR blob data 224 represents a local copy of DATA1 with respect to a virtual machine that issued read request 301, since both the virtual machine and the storage node are part of the same cluster.

Table server 218 also updates index 204 to associate CoR LU1 with the physical storage location newly assigned to the copy-on-read blob. For example, as shown in FIG. 3, index 204 associates a pointer (shown as Pointer 1 in FIG. 3) with CoR LU1, which points to the newly assigned location of the copy-on-read blob. Table server 218 may return DATA1 to front end server 216 via a response 309. Front end server 216 provides response 309 to the virtual machine that provided read request 301.

It is noted that in certain embodiments, table server 218 provides the remote identifier to front end server 216, and front end server 216 provides a read request to source blob 222 specifying logical unit(s) of source blob 222 corresponding to CoR LU1. In accordance with such embodiments, source blob 222 may return response 305 to table server 218, which then provides response 305 to front end server 216. Alternatively, source blob 222 may return response 305 directly to front end server 216.

It is further noted that upon receiving response 305, table server 218 may not copy the data included therein to a physical storage location. For example, it has been observed that read requests received from a virtual machine during its bootup phase may perform more efficiently if data retrieved from source blob 222 is not copied to the copy-on-read blob, so long as the number of virtual machines concurrently performing read requests to source blob 222 during their respective bootup phases do not exceed concurrency limits for source blob 222.

Figure 4:
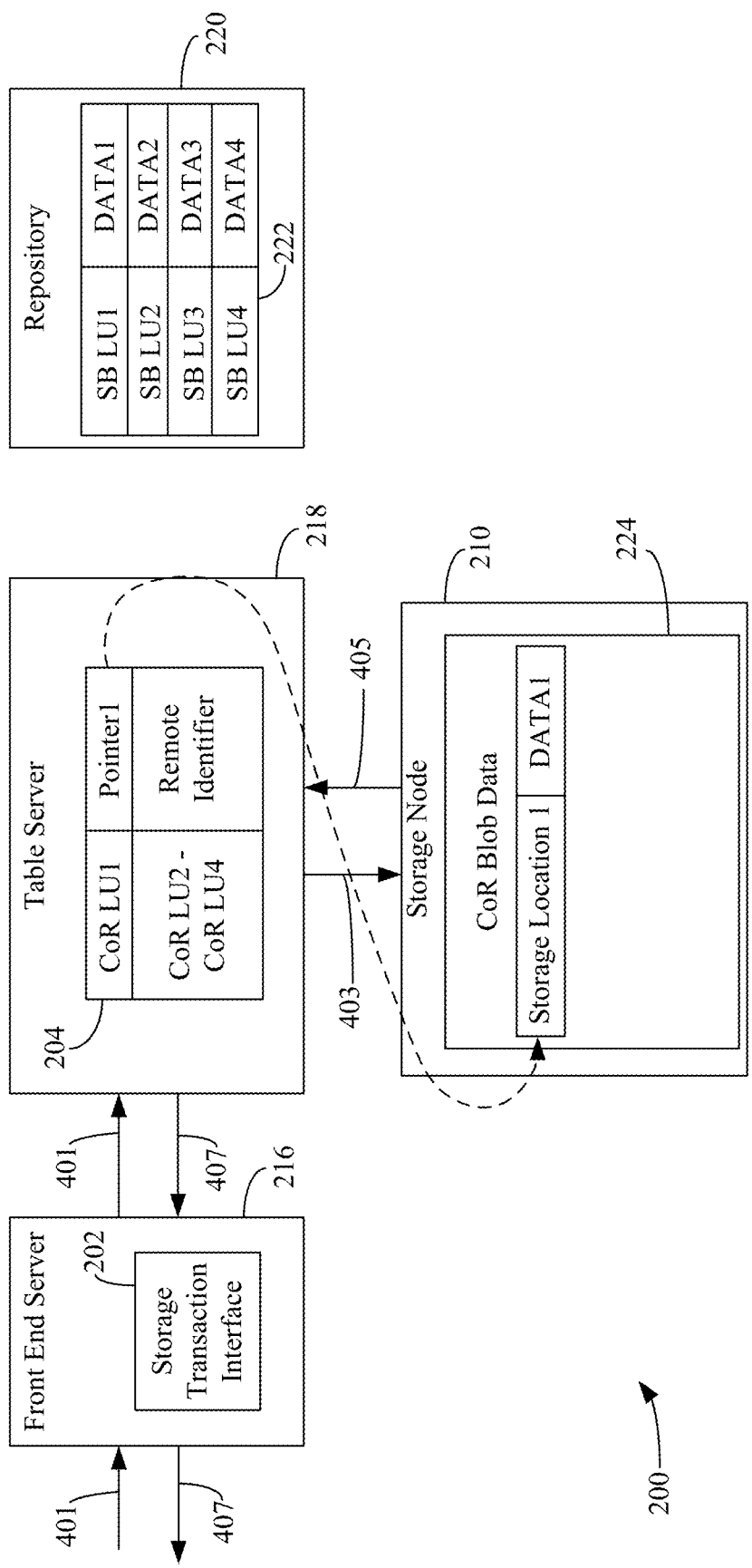
FIG. 4 is a block diagram of a storage system illustrating the handling of a subsequent read request directed to a logical unit to which data has been copied to a copy-on-read blob, according to an example embodiment.

FIG. 4 is a block diagram of storage system 200 illustrating the handling of a subsequent read request directed to a logical unit to which data has been copied to a copy-on-read blob in accordance with an embodiment. As shown in FIG. 4, front end server 216, via storage transaction interface 202, receives a read request 401 specifying logical unit(s) from which data is to be retrieved. In the example shown in FIG. 4, read request 401 specifies logical unit CoR LU1. Front end server 216 provides read request 401 to table server 218. Table server 218, using index 204, determines CoR LU1 is associated with a pointer (i.e., Pointer 1) that points to Storage Location 1 associated with the copy-on-read blob instead of the remote identifier. This is a result of the data located at a logical unit corresponding to CoR LU1 (i.e., SB LU1) being copied to Storage Location 1 of the copy-on-read blob responsive to receiving read request 301 (as described above in FIG. 3).

Table server 218 may send a read request 403 to storage node 210 that specifies Storage Location 1. Storage node 210 returns a response 405 that includes DATA1 to table server 218. Responsive to receiving response 405, table server 218 may return DATA1 to front end server 216 via a response 407. Front end server 216 provides response 407 to the virtual machine that provided read request 401.

Figure 5:
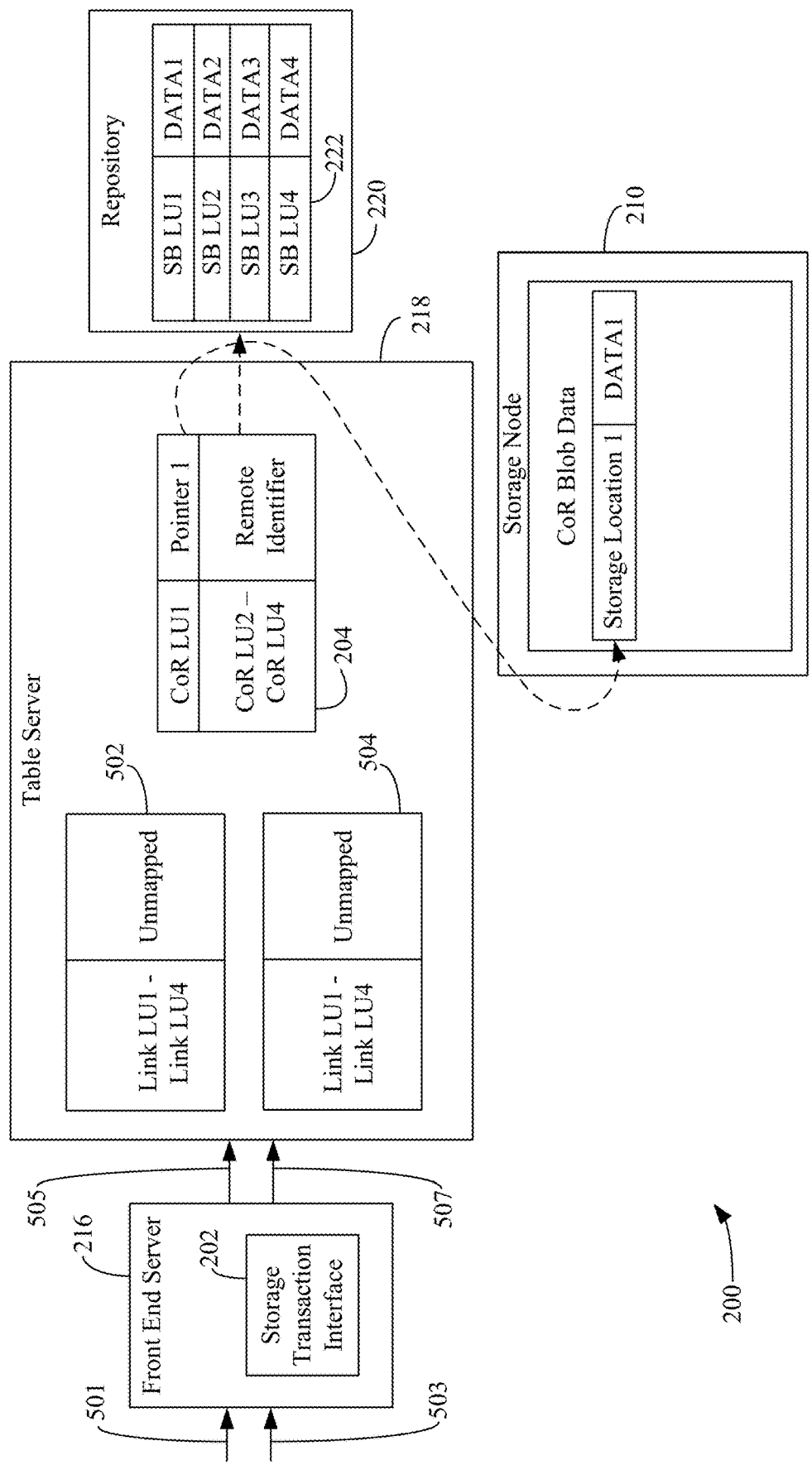
FIG. 5 is a block diagram of a storage system illustrating the creation of an index for each of a plurality of link blobs, according to an example embodiment.

FIG. 5 is a block diagram of storage system 200 illustrating the creation of an index for each of a plurality of link blobs in accordance with an embodiment. As described above, blob management entity 124 may provide a copy request to create a link blob for each virtual machine that is to be provisioned. As shown in FIG. 5, two virtual machines are to be provisioned. Thus, blob management entity 124 provides a copy request 501, via storage transaction interface 202, to front end server 216 to create a first link blob, and a copy request 503, via storage transaction interface 202, to front end server 216 to create a second link blob. In response to receiving copy request 501, front end server 216 provides a command 505 to table server 218 that causes table server 218 to create an index 502 for the first link blob. In response to receiving copy request 503, front end server 216 provides a command 507 to table server 218 that causes table server 218 to create an index 504 for the second link blob. Each of index 502 and index 504 may have one or more entries corresponding to each logical unit or range of logical units of index 204 (i.e., CoR LU1-CoR LU4). For example, in the example shown in FIG. 5, each of index 502 and index 504 includes one or more entries representing a range of logical units (i.e., Link LU1-Link LU4) that correspond to CoR LU1-CoR LU4.

In accordance with an embodiment, Link LU1-Link LU4 indirectly maps to CoR LU1-CoR LU4. For example, Link LU1-Link LU4 may be logical unit addresses that are mapped to CoR LU1-CoR LU4 using an address translation process. In accordance with another embodiment, Link LU1-Link LU4 directly map to CoR LU1-CoR LU4. For example, Link LU1-Link LU4 and CoR LU1-CoR LU4 and correspond to the same logical unit addresses.

As explained above, when a read request is directed to a link blob, the read data is retrieved either from a physical storage location assigned to the link blob, a physical storage location assigned to the copy-on-read blob or source blob 222. Each of index 502 and 504 identifies whether data requested at a particular logical unit is retrievable from a physical storage location assigned to the link blob. If data requested for a particular logical unit is not retrievable from the particular link blob, then the corresponding index (i.e., index 502 or index 504) indicates that the location at which the data is retrieved is unmapped. In the example shown in FIG. 5, write data has not been written to any of the link blobs. Thus, each of index 502 and index 504 indicates that the location at which the data is retrieved at each of Link LU1-Link LU4 is unmapped. If write data has been written to a logical unit of a particular link blob, the corresponding index associates a pointer with that logical unit, which points to the physical storage location assigned to the link blob that stores the data. It is noted that while FIG. 5 shows each of index 204, index 502 and index 504 being stored and maintained by table server 218, each of index 204, index 502 and index 504 may be stored and maintained on a different table server.

Figure 6:
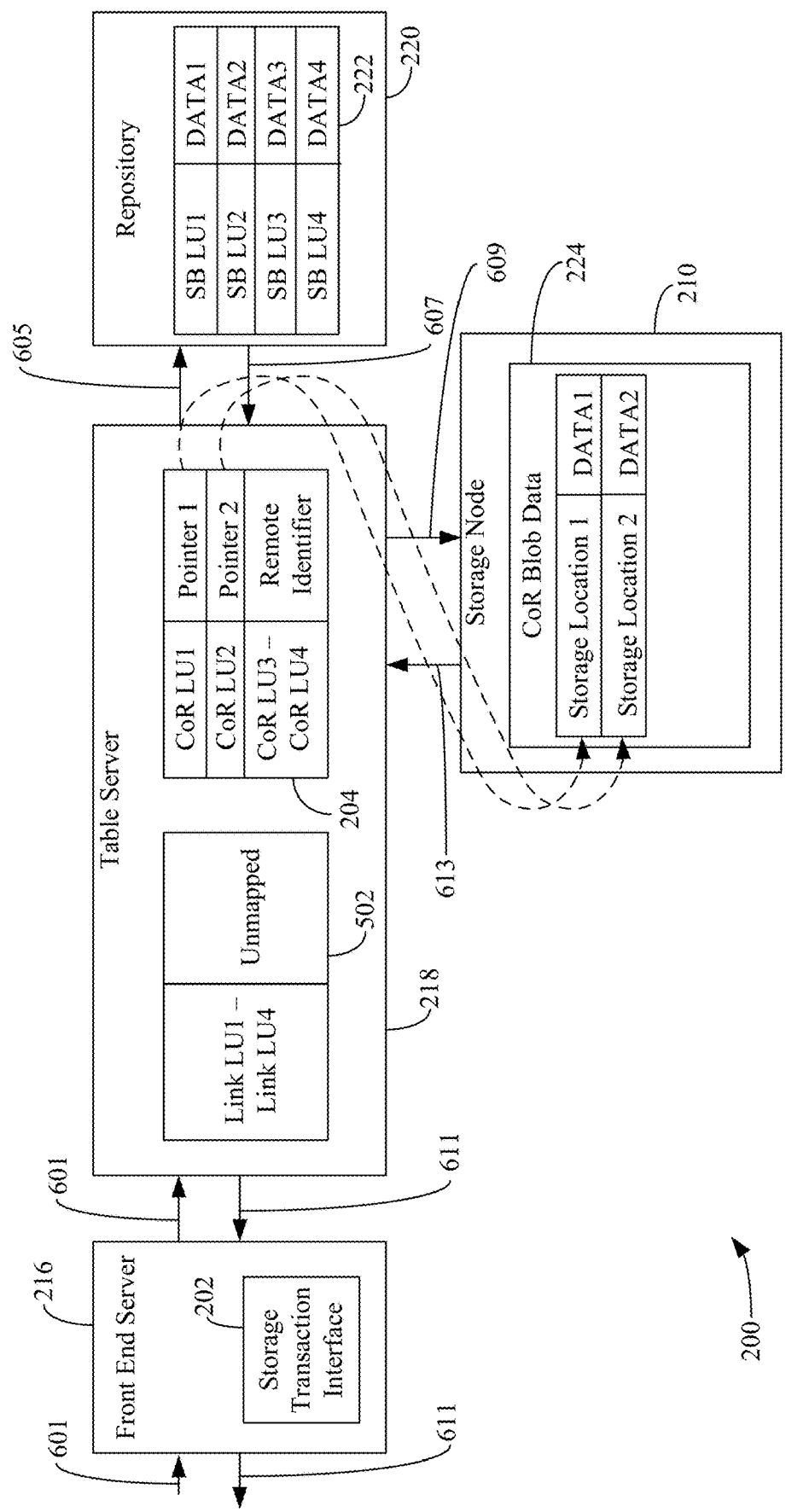
FIG. 6 is a block diagram of a storage system illustrating the handling of a read request directed to a first link blob, according to an example embodiment.

FIG. 6 is a block diagram of storage system 200 illustrating the handling of a read request directed to a first link blob in accordance with an embodiment. Because the following description is directed to a read request to the first link blob, index 504 is not shown for brevity. As shown in FIG. 6, front end server 216, via storage transaction interface 202, receives a read request 601 specifying one or more logical units from which data is to be retrieved. Read request 601 may be provided by a virtual machine (e.g., virtual machine 114, as shown in FIG. 1). Front end server 216 provides read request 601 to table server 218. In the example shown in FIG. 6, read request 601 specifies that data is to be retrieved from Link LU2. Table server 218, using index 502, determines that data located at Link LU1 is unmapped to a physical storage location of the first link blob. As a result, table server 218 determines whether the copy-on-read blob (i.e., CoR blob data 224) contains the data.

For example, table server 218 may determine a logical unit maintained by index 204, which is associated with the copy-on-read blob, that corresponds to Link LU2. In the example shown in FIG. 6, table server 218 determines that CoR LU2 corresponds to Link LU2. Table server 218, using index 204, determines CoR LU2 is associated with a remote identifier (as shown in FIG. 5) and provides a read request 605 to the cluster and/or node on which source blob 222 is located using the remote identifier. Read request 605 may specify logical unit(s) of source blob 222 corresponding to CoR LU2. In the example shown in FIG. 6, the logical unit corresponding to CoR LU2 is SB LU2. Thus, source blob 222 returns a response 607 including DATA2 to table server 218. Responsive to receiving response 607, table server 218 may copy DATA2 to a physical storage location (shown as Storage Location 2 in FIG. 6) assigned to the copy-on-read blob. For example, table server 218 may provide DATA2 to storage node 210 via a write request 609. Storage node 210 may determine the physical storage location to which DATA2 is to be copied and store DATA2 thereat. Storage node 210 may also provide a response 613 to table server 218 that specifies the determined physical storage location.

Table server 218 may update index 204 to associate CoR LU2 with the physical storage location specified by response 613. For example, as shown in FIG. 6, index 204 associates a pointer (shown as Pointer 2 in FIG. 6) to CoR LU2, which points to the newly assigned location of the copy-on-read blob. In accordance with an embodiment, table server 218 may return DATA2 to front end server 216 via a response 611 (as shown in FIG. 6), and front end server 216 provides response 611 to the virtual machine that provided read request 601. In accordance with another embodiment, table server 218 provides a pointer to DATA2 (e.g., Pointer 2) to front end server 216 via response 611, and front end server 216 retrieves DATA2 using the pointer and provides DATA2 to the virtual machine that provided read request 601. In accordance with yet another embodiment, table server 218 provides the remote identifier to front end server 216, and front end server 216 provides a read request to source blob specifying logical unit(s) of source blob 222 corresponding to CoR LU2. In accordance with such an embodiment, source blob 222 may return response 607 (which includes DATA2) to table server 218, which then provides response 607 to front end server 216. Alternatively, source blob 222 may return response 607 directly to front end server 216. Front end server 216 provides response 607 to the virtual machine that provided read request 601.

Figure 7:
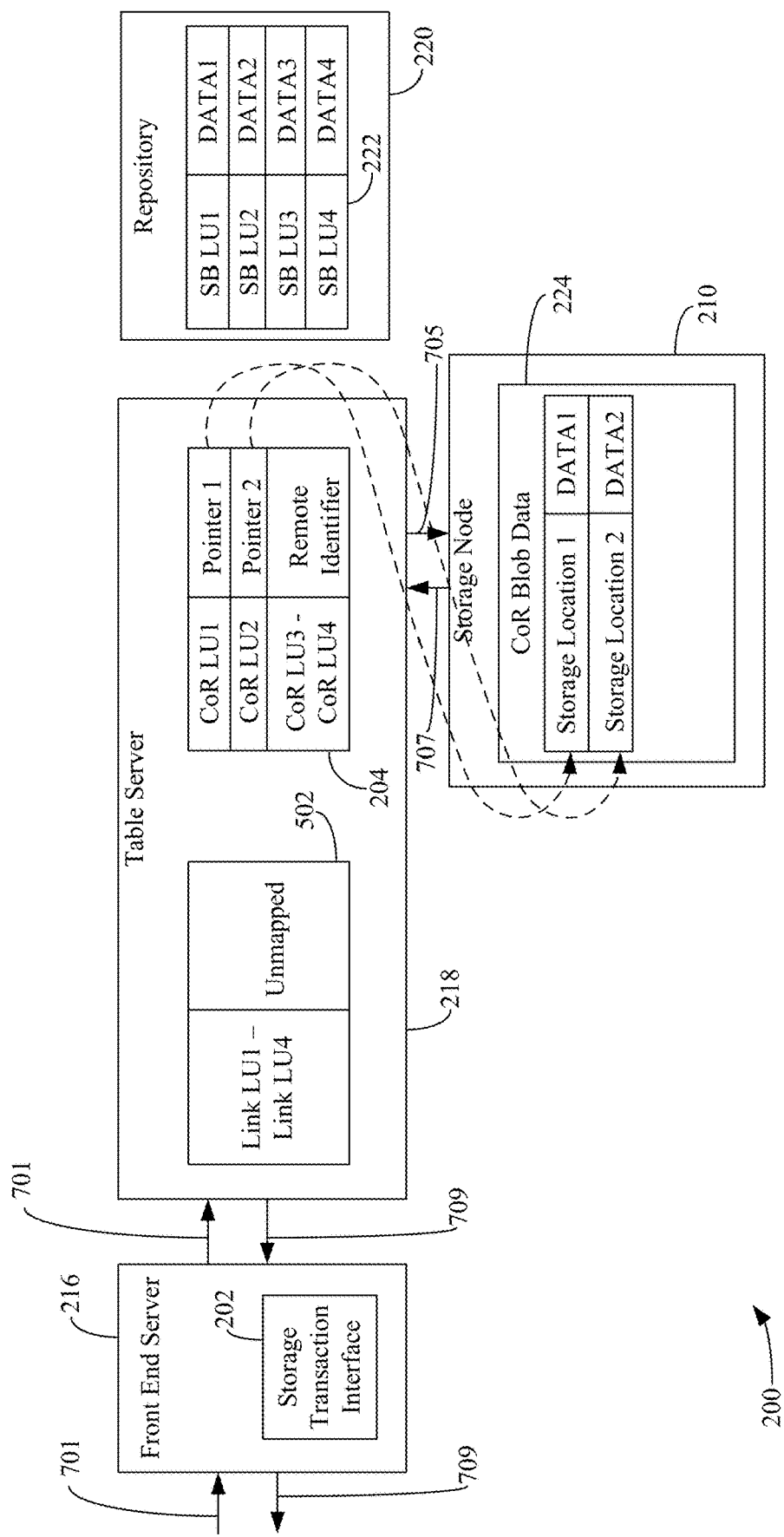
FIG. 7 is a block diagram of a storage system illustrating the handling of a subsequent read request directed to a logical unit of the first link blob for which data has been copied to a copy-on-read blob, according to an example embodiment.

FIG. 7 is a block diagram of storage system 200 illustrating the handling of a subsequent read request directed to a logical unit of the first link blob for which data has been copied to a copy-on-read blob in accordance with an embodiment. As shown in FIG. 7, storage transaction interface 202 receives a read request 701 specifying logical unit(s) from which data is to be retrieved. In the example shown in FIG. 7, read request 701 specifies logical unit Link LU2. Table server 218, using index 502, determines that data located at Link LU2 is unmapped to a physical storage location of the first link blob. As a result, table server 218 determines whether the CoR blob data 224 contains the data.

For example, table server 218 may determine a logical unit maintained by index 204 that corresponds to Link LU2. In the example shown in FIG. 7, table server 218 determines that CoR LU2 corresponds to Link LU2. Table server 218, using index 204, determines CoR LU2 is associated with a pointer (i.e., Pointer 2) pointing to Storage Location 2 to CoR LU2 instead of the remote identifier. This is a result of the data located at a logical unit corresponding to CoR LU2 (i.e., SB LU2) being copied to Storage Location 2 of the copy-on-read blob responsive to receiving read request 601 (as described above in FIG. 6).

It is noted that in certain scenarios, data may be retrieved from both CoR blob data 224 and source blob 222 depending on the logical units specified by a read request. For example, with continued reference to FIG. 7, if a read request specifies logical units Link LU2 and Link LU3, table server 218 may retrieve DATA2 from Storage Location 2 of CoR blob data 224 and retrieve DATA3 from SB LU3 of source blob 222. Table server 218 may then provide DATA2 and DATA3 to front end server 216 via one or more responses.

Figure 8:
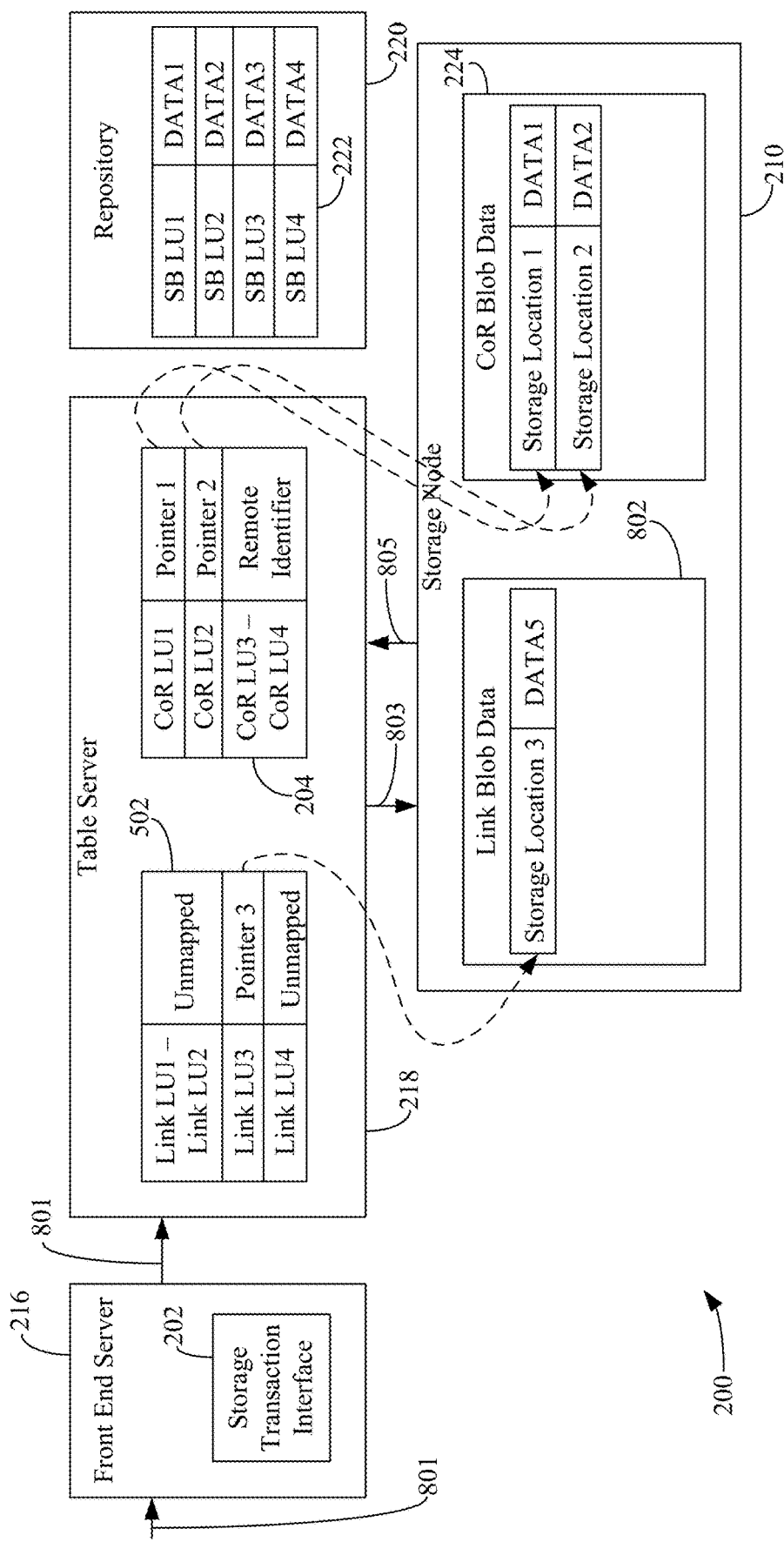
FIG. 8 is a block diagram of a storage system illustrating the handling of a write request directed to the first link blob, according to an example embodiment.

FIG. 8 is a block diagram of storage system 200 illustrating the handling of a write request directed to the first link blob in accordance with an embodiment. As shown in FIG. 8, front end server 216, via storage transaction interface 202, receives a write request 801 specifying logical unit(s) to which data associated with write request 801 is to be written. Front end server 216 provides write request 801 to table server 218. In the example shown in FIG. 8, write request 801 specifies logical unit Link LU3. Table server 218 may provide the write data to storage node 210 via a write request 803. Storage node 210 may determine a physical storage location of storage node 210 to which the data is to be written and write the data thereto. In the example shown in FIG. 8, storage node 210 determines that the write data should be written to Storage Location 3. The write data written to storage node 210 represents data stored locally by the link blob (shown as link blob data 802 in FIG. 8) that is not stored by CoR blob data 224 or source blob 222. Storage node 210 may also provide a response 805 to table server 218 that specifies the determined physical storage location.

Table server 218 may update index 504 to associate Link LU3 with the determined physical storage location to which the write data was written, as specified by response 805. For example, as shown in FIG. 8, index 502 associates a pointer (shown as Pointer 3 in FIG. 8) with Link LU3, which points to the Storage Location 3 of link blob data 802.

Figure 9:
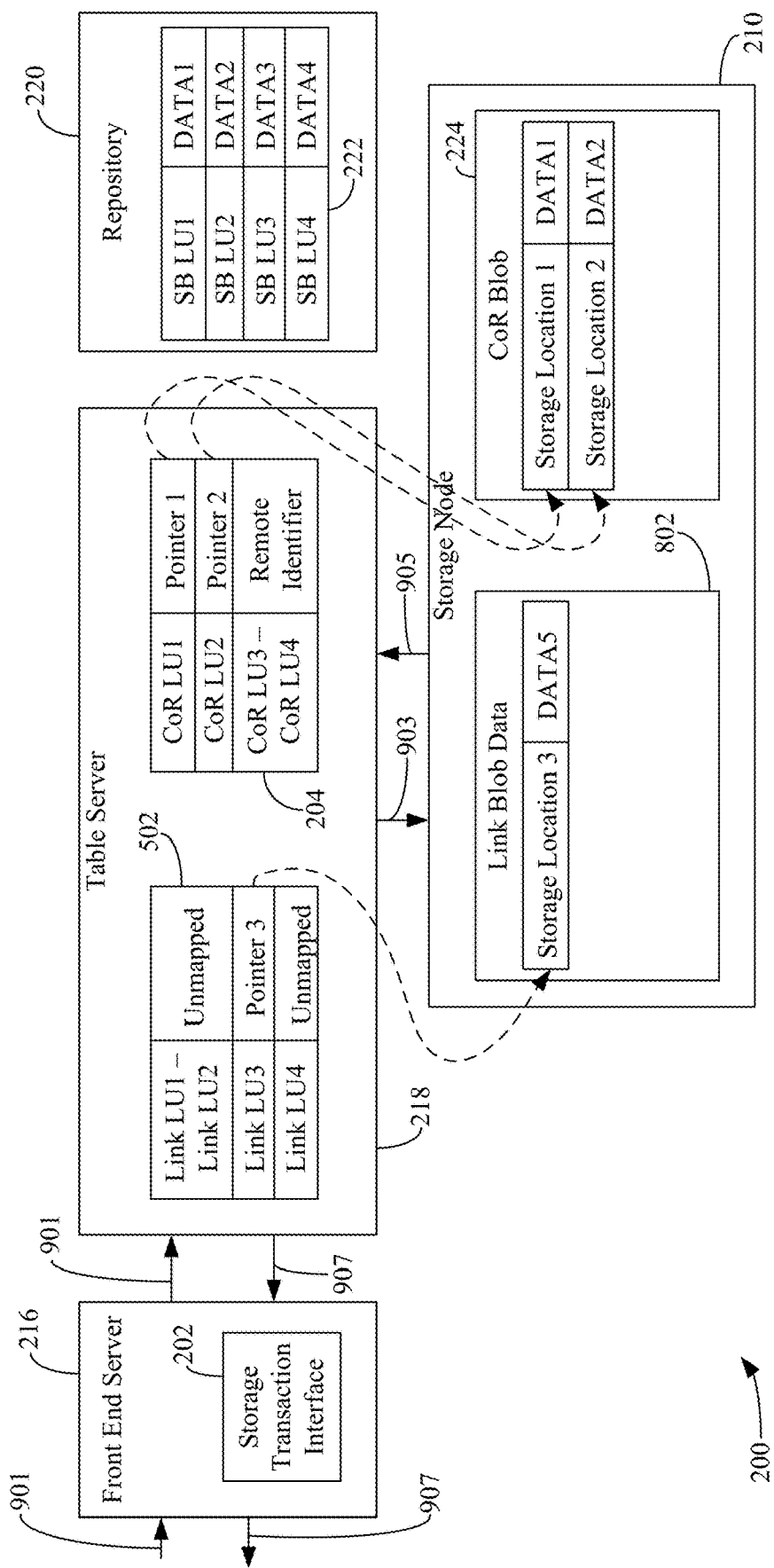
FIG. 9 is a block diagram of a storage system illustrating the handling of a subsequent read request directed to a logical unit of the first link blob for which data has been written, according to an example embodiment.

FIG. 9 is a block diagram of storage system 200 illustrating the handling of a subsequent read request directed to a logical unit of the first link blob for which data has been written in accordance with an embodiment. As shown in FIG. 9, front end server 216, via storage transaction interface 202, receives a read request 901 specifying logical unit(s) from which data is to be retrieved. Front end server 216 provides read request 901 to table server 218. In the example shown in FIG. 9, read request 901 specifies logical unit Link LU3. Table server 218, using index 502, determines that data located at Link LU3 is associated with Pointer 3. Thus, data located at Link LU3 is mapped to a physical storage location associated with the first link blob. To retrieve the data from link blob data 802, table server 218 issues a read request 903 that identifies Storage Location 3 to storage node 210. Storage node 210 provides the data located at Storage Location 3 (i.e., DATA5) to table server 218 via a response 905. Table server 218 provides DATA5 to front end server 216 via a response 907, and front end server 216 provides response 907 to the entity that issued read request 901.

It is noted that while FIG. 9 shows CoR blob data 224 and link blob data 802 as being on the same storage node (i.e., storage node 210), CoR blob data 224 and link blob data 802 may each be stored on a different storage node located within the same cluster or, alternatively, on a different storage node located within a different cluster.

Figure 10A:
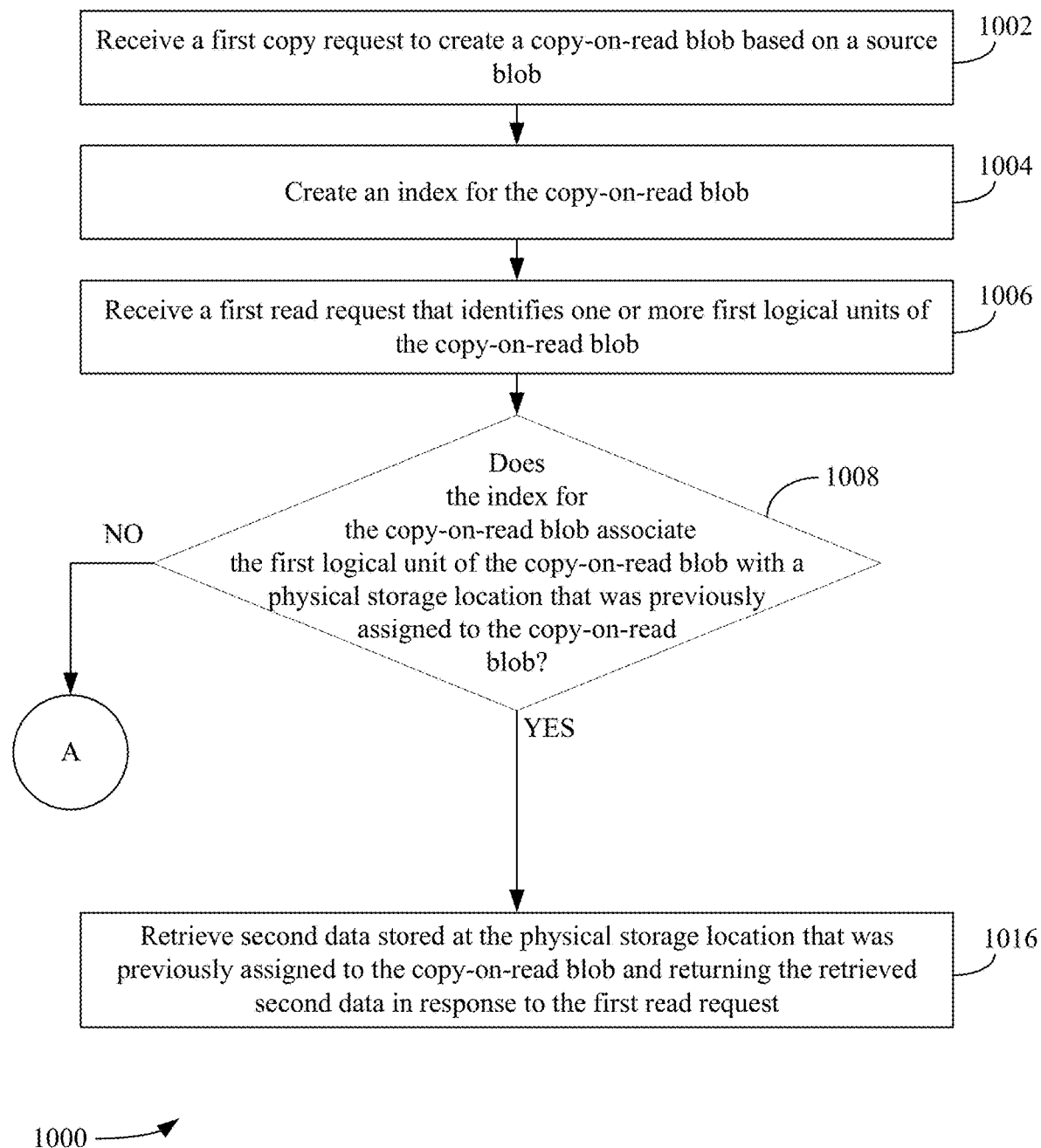
FIGS. 10A and 10B depict a flowchart of a method for creating a copy-on-read blob and handling read requests directed to the copy-on-read blob, according to an example embodiment.
Figure 10B:
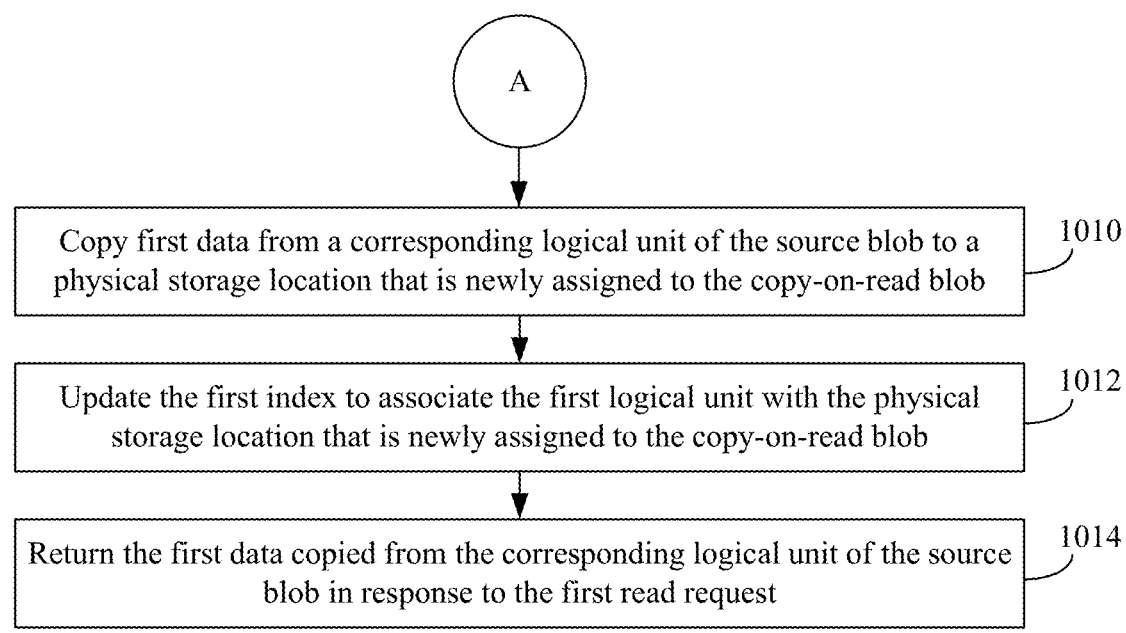

FIGS. 10A and 10B depict a flowchart 1000 of a method for creating a copy-on-read blob and handling read requests directed to the copy-on-read blob in accordance with an embodiment. Flowchart 1000 will be described with continued reference to storage system 200, as described above with reference to FIGS. 2-4. Other structural and operational embodiments will be apparent to persons skilled in the relevant art(s) based on the following discussion regarding flowchart 1000 and storage system 200 of FIGS. 2-4.

Flowchart 1000 begins with step 1002. In step 1002, a first copy request to create a copy-on-read blob based on a source blob is received. For example, with reference to FIG. 2, front end server 216 receives copy request 201 to create a copy-on-read blob based on source blob 222.

At step 1004, an index is created for the copy-on-read blob in response to receiving the first copy request. For example, with reference to FIG. 2, table server 218 creates index 204 for the copy-on-read blob.

At step 1006, a first read request that identifies one or more first logical units of the copy-on-read blob is received. For example, with reference to FIG. 3, front end server 216 receives read request 301 that identifies a first logical unit (i.e., CoR LU1) of the copy-on-read blob.

At step 1008, in response to receiving the first read request, for each logical unit of the copy-on-read blob identified by the first read request, a determination is made as to whether the index for the copy-on-read blob associates the first logical unit of the copy-on-read blob with a physical storage location that was previously assigned to the copy-on read blob. For example, with reference to FIG. 3, table server 218 determines whether index 204 associates the first logical unit of the copy-on-read blob (i.e., CoR LU1) with a physical storage location that was previously assigned to the copy-on-read blob.

If a determination is made that the index for the copy-on-read blob does not associate the first logical unit of the copy-on-read blob with a physical storage location that was previously assigned to the copy-on-read blob, flow continues to step 1010 (as shown in FIG. 10B).

At step 1010, first data from a corresponding logical unit of the source blob is copied to a physical storage location that is newly assigned to the copy-on-read blob. For example, as shown in FIG. 3, table server 218 provides a read request 303 to repository 220 for data located at a corresponding logical unit (i.e., SB LU1) of source blob 222. Repository 220 provides a response 305 including the data (i.e., DATA1). Table server 218 copies the data to a physical storage location (i.e., Storage Location 1) newly assigned to the copy-on-read blob via write request 307 to storage node 210.

At step 1012, the first index is updated to associate the first logical unit with the physical storage location that is newly assigned to the copy-on-read blob. For example, with reference to FIG. 3, table server 208 updates index 204 to associate CoR LU1 with Pointer 1 that points to Storage Location 1.

At step 1014, the first data copied from the corresponding logical unit of the source blob is returned in response to the first read request. For example, with reference to FIG. 3, table server 218 provides DATA1 to front end server 216 via response 309. Front end server 216 provides response 309 to the entity (e.g., virtual machine 114, as shown in FIG. 1) that issued first read request 301.

Returning now to the description of step 1008, if a determination is made that the index for the copy-on-read blob does associate the first logical unit of the copy-on-read blob with a physical storage location that was previously assigned to the copy-on-read blob, then flow continues to step 1016 (as shown in FIG. 10A).

At step 1016, second data stored at the physical storage location that was previously assigned to the copy-on-read blob is retrieved and returned in response to the first request. For example, with reference to second read request 401 of FIG. 4, table server 218 provides read request 403 that specifies that data is to be read from Storage Location 1 to storage node 210. Storage node 210 provides the data (i.e., DATA1) to table server 218 via response 405. Table sever 218 provides DATA1 to front end server 216 via response 407, and front end server 216 provides response 407 to the entity requesting the data.

Figure 11:
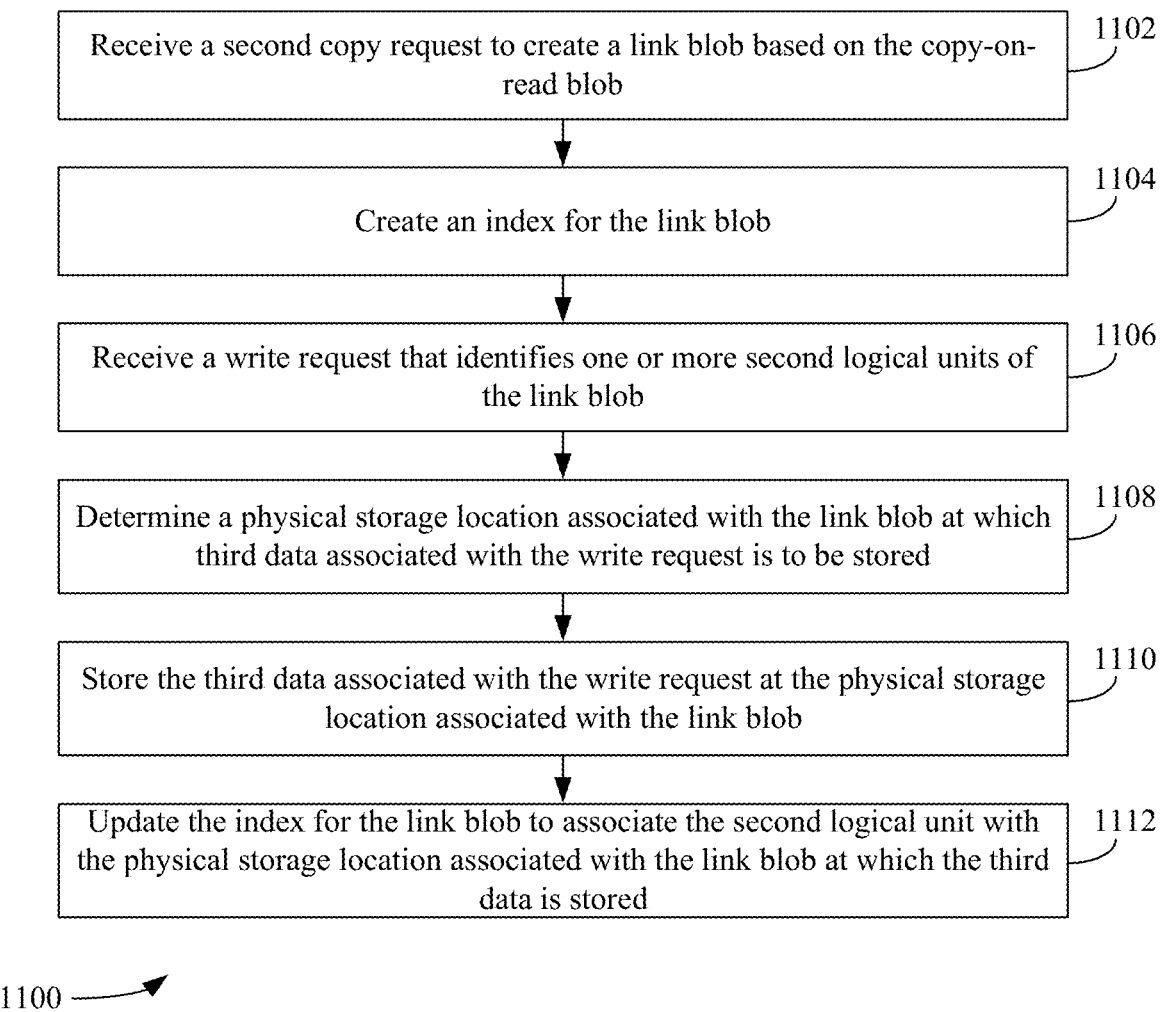
FIG. 11 depicts a flowchart of a method for creating a link blob and handling a write request directed to a link blob, according to an example embodiment.

FIG. 11 depicts a flowchart 1100 of a method for creating a link blob and handling a write request directed to the link blob in accordance with an embodiment. Flowchart 1100 will be described with continued reference to storage system 200, as described above with reference to FIGS. 5 and 8. Other structural and operational embodiments will be apparent to persons skilled in the relevant art(s) based on the following discussion regarding flowchart 1100 and storage system 200 of FIGS. 5 and 8

Flowchart 1100 begins with step 1102. In step 1102, a second copy request to create a link blob based on the copy-on-read blob is received. For example, with reference to FIG. 5, front end server 216 receives copy request 501 to create a link blob based on the copy-on-read blob.

At step 1104, an index for the link blob is created in response to receiving the second copy request. For example, with reference to FIG. 5, table server 218 creates index 502 for the link blob.

At step 1106, a write request that identifies one or more second logical units of the link blob is received. For example, with reference to FIG. 8, front end server 216 receives write request 801 that identifies a second logical unit (i.e., Link LU3) of the link blob.

At step 1108, in response to receiving the write request, for each second logical unit identified by the write request, a physical storage location associated with the link blob at which third data associated with the write request is to be stored is determined. For example, with reference to FIG. 8, table server 218 may provide write request 803 to storage node 210, and storage node 210 determines a physical storage location (i.e., Storage Location 3) associated with the link blob at which third data (i.e., DATA5) associated with the link blob is to be stored.

At step 1110, the third data associated with the write request at the physical storage location associated with the link blob is stored. For example, with reference to FIG. 8, table server 218 issues a write request 803 to storage node 210 that causes DATA5 to be stored at Storage Location 3.

At step 1112, the index for the link blob is updated to associate the second logical unit with the physical storage location associated with the link blob at which the third data is stored. For example, with reference to FIG. 8, storage node 210 provides response 805 that specifies the physical storage location determined thereby to table sever 218, and table server 218 updates index 502 to associate Link LU3 with Pointer 3, which points to Storage Location 3.

In embodiments, one or more of steps 1102, 1104, 1106, 1108, 1110 and/or 1112 of flowchart 1100 may not be performed. Moreover, steps or operations in addition to or in lieu of those in flowchart 1100 may be performed. Further, one or more of steps 1102, 1104, 1106, 1108, 1110 and/or 1112 of flowchart 1100 may be performed out of order, in an alternate sequence, or partially (or completely) concurrently with each other or with other operations.

Figure 12:
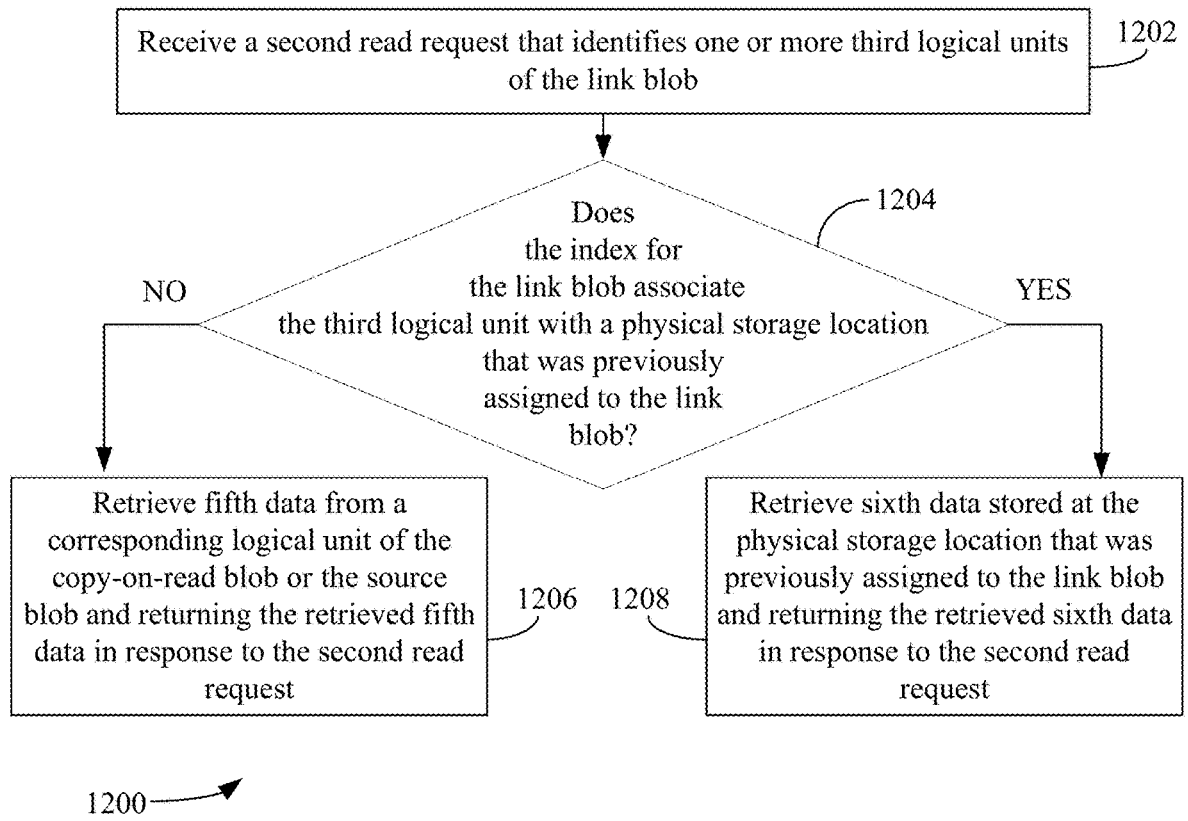
FIG. 12 depicts a flowchart of a method for handling a read request directed to the link blob, according to an example embodiment.

FIG. 12 depicts a flowchart 1200 of a method for handling a read request directed to the link blob in accordance with an embodiment. Flowchart 1100 will be described with continued reference to storage system 200, as described above with reference to FIGS. 7 and 9. Other structural and operational embodiments will be apparent to persons skilled in the relevant art(s) based on the following discussion regarding flowchart 1200 and storage system 200 of FIGS. 7 and 9.

Flowchart 1200 begins with step 1202. In step 1202, a second read request that identifies one or more third logical units of the link blob is received. For example, with reference to FIG. 7, front end server 216 receives a read request 701 that identifies a third logical unit (Link LU2) of the link blob.

At step 1204, in response to receiving the second read request, for each third logical unit of the link blob identified by the second read request, a determination is made as to whether the index for the link blob associates the third logical unit of the link blob with a physical storage location that was previously assigned to the link blob. For example, with reference to FIG. 7, table server 218 determines whether index 502 associates the third logical unit of the link blob (i.e., Link LU2) with a physical storage location that was previously assigned to the link blob.

If a determination is made that the index for the link blob does not associate the third logical unit of the link blob with a physical storage location that was previously assigned to the link blob, flow continues to step 1206. Otherwise, flow continues to step 1208.

At step 1206, fifth data from a corresponding logical unit of the copy-on-read blob or the source blob is retrieved and returned in response to the second request. For example, as shown in FIG. 7, because table server 218 determines that index 502 does not associate Link LU2 with a physical storage location that was previously assigned to the link blob, table server 218 determines a corresponding logical unit of the copy-on-read blob (i.e., CoR LU2) and determines whether the data is stored by the copy on read blob. In the example shown in FIG. 7, the data is stored by the copy-on-read blob (i.e., CoR blob data 224). Therefore, table server 218 provides a read request 705 to storage node 210 for data located at Storage Location 2 using Pointer 2. Storage node 210 provides a response 707 with the requested data (i.e., DATA2), and table server 218 provides DATA2 to front end server 216 via response 709. Front end server 216 provides response 709 to the entity that issued second read request 701.

At step 1208, sixth data stored at the physical storage location that was previously assigned to the link blob is retrieved and returned in response to the second read request. For example, with reference to read request 901 as shown in FIG. 9, table server 218 determines that Link LU3 is associated with Pointer 3, and therefore, determines that index 502 associates Link LU3 with a physical storage location that was previously assigned to the link blob. Thus, table server 218 provides a read request 903 to storage node 210 for data located at Storage Location 3 using Pointer 3. Storage node 210 provides a response 905 with the requested data (i.e., DATA5), and table server 218 provides DATA5 to front end server 216 via response 907. Front end server 216 provides response 907 to the entity that requested DATA5.

III. Additional Embodiments

A. Reference Tracking

In accordance with an embodiment, table server 118 (as shown in FIG. 1) is configured to track the number of blobs that reference (and are created based on) a particular blob. For example, as described above, copy-on-read blobs may reference a source blob for read data, and link blobs may reference a copy-on-read blob for read data. Accordingly, table server 118 may track the number of link blobs that reference a particular copy-on-read blob and track the number of copy-on-read blobs that reference a particular source blob (e.g., source blob 122).

Figure 13:
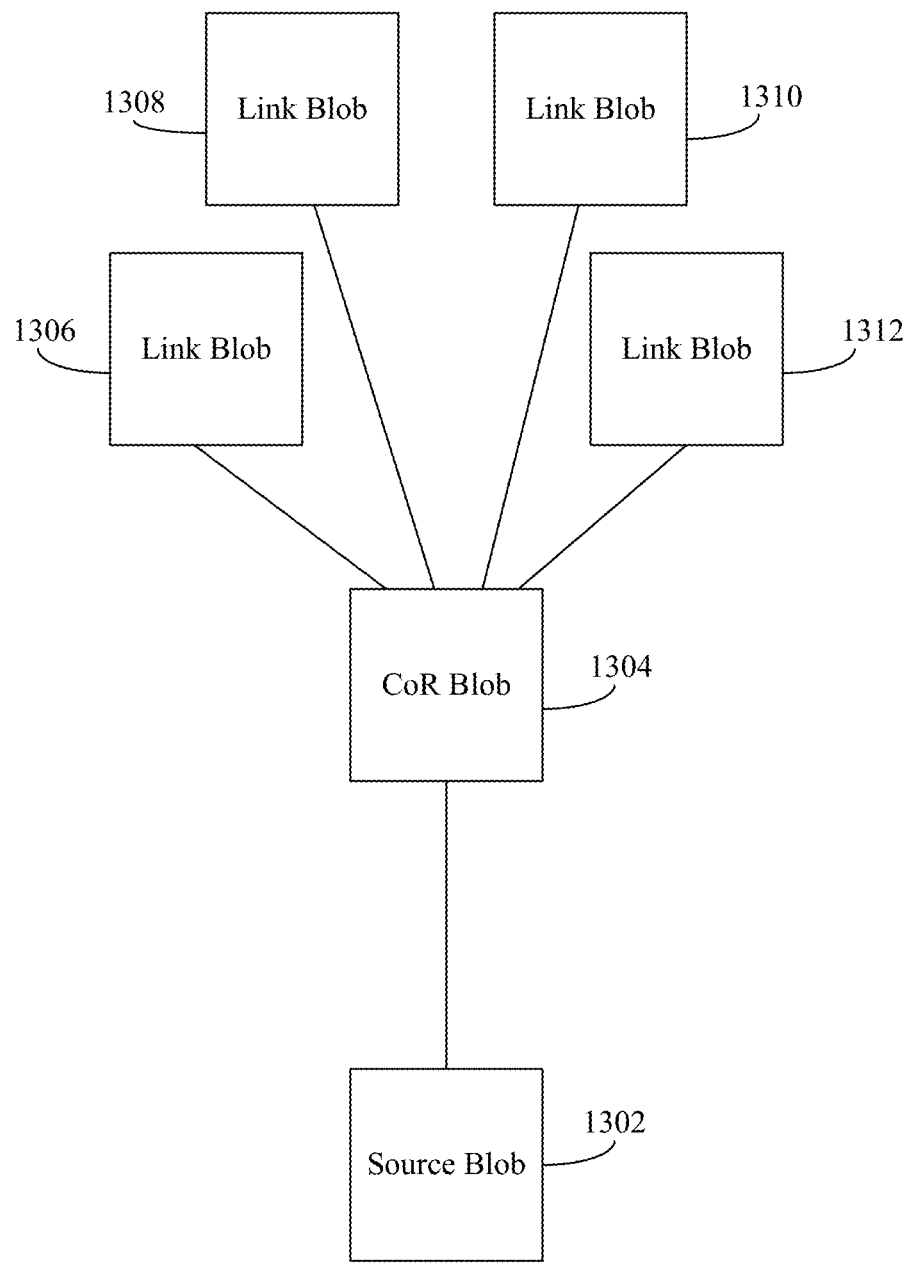
FIG. 13 is a block diagram illustrating a plurality of blobs, according to an example embodiment.

For example, FIG. 13 is a block diagram illustrating a plurality of blobs in accordance with an embodiment. In particular, FIG. 13 shows a source blob 1302, a copy-on-read blob 1304, a first link blob 1306, a second link blob 1308, a third link blob 1310 and a fourth link blob 1312. As shown in FIG. 13, first link blob 1306, second link blob 1308, third link blob 1310 and fourth link blob 1312 are created based on copy-on-read blob 1304. Copy-on-read blob 1304 is created based on source blob 1302.

For each source blob maintained by the network-accessible server set, front end server 116 may be configured to maintain a first reference count that is indicative of the number of copy-on-read blobs that are created based on the source blob (e.g., source blob 1302). The first reference count may be incremented each time a copy request to create a copy-on-read blob is received by front end server 116. In the example shown in FIG. 13, one copy request to create a copy-on-read blob is received, and therefore, one copy-on-read blob (i.e., copy-on-read blob 1304) has been created. Thus, the first reference count is 1. It is noted that the first reference count may be indicative of an estimate (rather than an actual number) of copy-on-read blobs that have been created based on a source blob. There may be some instances in which a copy request to create a copy-on-read blob is received, but the copy-on-read blob is not created (e.g., due to computing errors or resource limitations). That is, the first reference count may be incremented based on receiving a copy request to create a copy-on-read blob, not the creation of the copy-on-read blob itself.

For each copy-on-read blob (e.g., copy-on-read blob 1304) created, table server 118 may be configured to maintain a second reference count that is indicative of the number of link blobs that are created based on the copy-on-read blob. The reference count may be incremented each time a copy request to create a link blob is received by front end server 116. In the example shown in FIG. 13, four copy requests to create a link blob have been received, and therefore, four link blobs (i.e., first link blob 1306, second link blob 1308, third link blob 1310 and fourth link blob 1312) have been created based on copy-on-read blob 1304. Thus, the second reference count is 4. It is noted that the second reference count may be indicative of an estimate (rather than an actual number) of link blobs that have been created based on a copy-on-read blob. There may be some instances in which a copy request to create a link blob is received, but the link blob is not created (e.g., due to computing errors or resource limitations). That is, the second reference count is incremented based on receiving a copy request to create a link blob, not the creation of the link blob itself.

In accordance with certain embodiments, a copy-on-read blob may be created based on an already-created copy-on-read blob. Thus, for each copy-on-read blob, table server 118 may be configured to maintain a third reference count that is indicative of the number of copy-on-read blobs that are created based on the copy-on-read blob. The reference count may be incremented each time a copy request to create a copy-on-read blob based on an already-created copy-on-read blob is received by front end server 116. It is noted that the third reference count may be indicative of an estimate (rather than an actual number) of copy-on-read blobs that have been created based on an already-created copy-on-read blob. There may be some instances in which a copy request to create such a copy-on-read blob is received, but the copy-on-read blob is not created (e.g., due to computing errors or resource limitations). That is, the third reference count is incremented based on receiving a copy request to create a copy-on-read blob based on an already-created copy-on-read blob, not the creation of the copy-on-read blob itself.

In the accordance with one or more embodiments, table server 118 is configured to provide the first reference count and/or the second reference count to a user, front end server 116 or a software entity to facilitate load balancing. For example, front end server 116 and/or a software application may provide a request to obtain the first reference count and/or the second reference count via an API. In another example, a user may interact with a graphical user interface (GUI) to issue a request to table server 118 to retrieve the first reference count and/or the second reference count. Additional details regarding load balancing are described below in Subsection III.B.

In accordance with another embodiment, front end server 116 is configured provide a data dependency graph to a user or a software entity. For example, a software application may provide a request to obtain the data dependency graph via storage transaction interface 202. In another example, a user may interact with a GUI to provide a request to front end server 216 to retrieve the data dependency graph.

The data dependency graph may describe a first relationship between source blob 1302 and each copy-on-read blob created based thereon (i.e., copy-on-read blob 1304). The data dependency graph may also describe, for each copy-on-read blob, a second relationship between the copy-on-read blob and each link blob (e.g., first link blob 1306, second link blob 1308, third link blob 1310 and fourth link blob 1312) created based on the copy-on-read blob. The data dependency graph may be appear similar to the block diagram shown in FIG. 13, where connections are shown between each copy-on-read blob and the source blob from which it is created based thereon, and between each link blob and the copy-on-read blob from which it is created based thereon. The data dependency graph may advantageously enable the user and/or software entity requesting the data dependency graph to determine how data is managed and organized.

B. Load Balancing

In accordance with an embodiment, the number of copy-on-read blobs that are based on a particular source blob, and/or the number of link blobs that are created based on a particular copy-on-read blob are limited to minimize the number of read requests that are provided to the copy-on-read blob(s) and source blob(s). The number of copy-on-read blobs and/or the number of link blobs may be limited in accordance with a threshold. In accordance with an embodiment, the threshold may be specified by a user or a software entity via an interface (e.g., via storage transaction interface 202).

When a copy request to create a new link blob is received and the second reference count has reached the threshold, a new copy-on-read blob is created and the new link blob is created based on the new copy-on-read blob. For example, referring again to FIG. 13, four link blobs have been created based on a copy-on-read blob. In a scenario where the threshold is set to 4 and blob management entity 124 issues a copy request to create a link blob based on the copy-on-read blob, blob management entity 124 may receive an error message indicating that the second reference count has reached the threshold. In response, blob management entity 124 may issue copy request(s) to create a new copy-on-read blob based on source blob 1302 and a new link blob that is based on the newly-created copy-on-read blob.

Alternatively, upon receiving the copy request for the link blob, front end server 116 may determine whether the second reference count has reached the threshold and cause another copy-on-read blob to be created based on source blob 1302 and cause the link blob to be created based on the newly-created copy-on-read blob.

Figure 14:
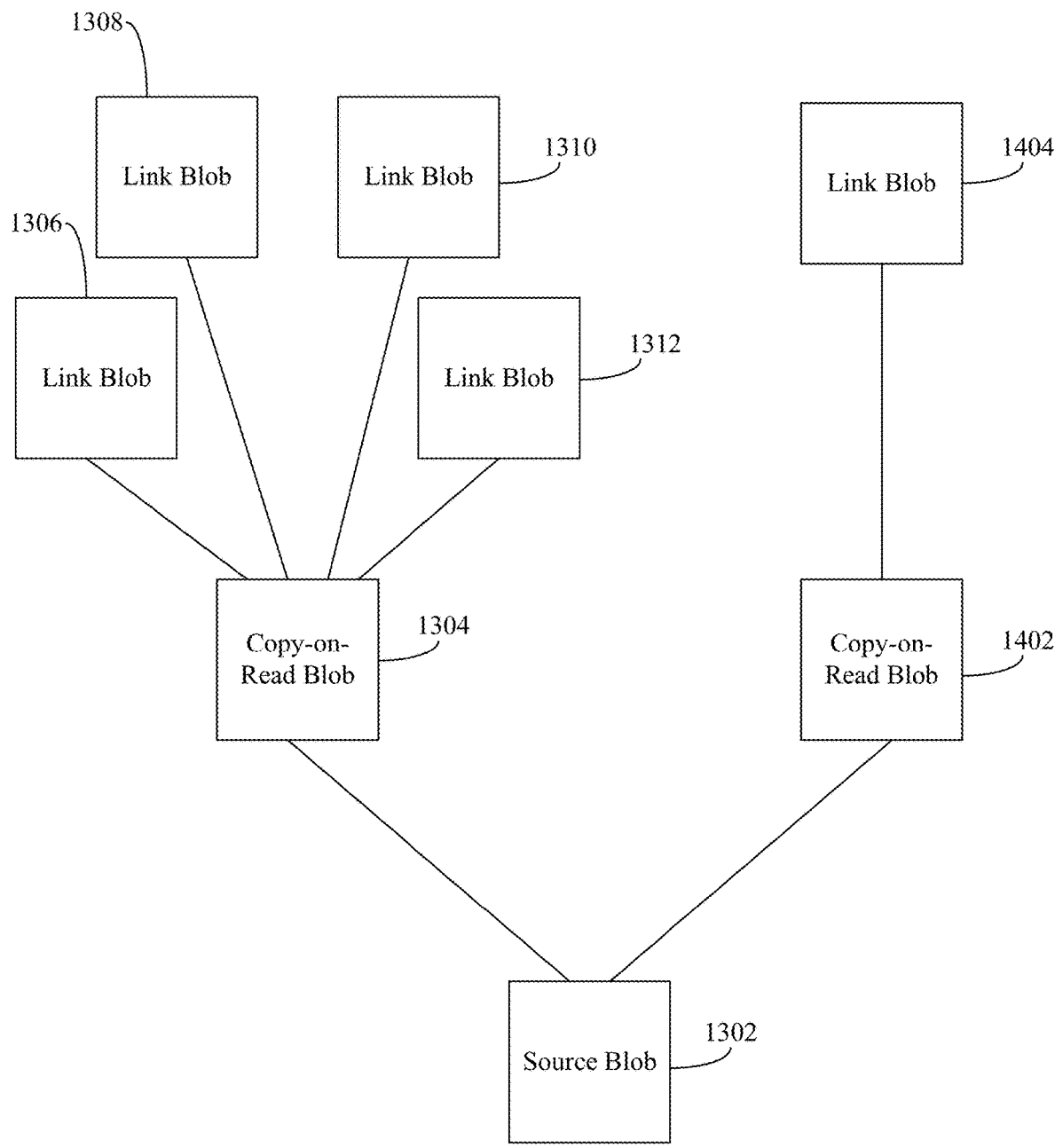
FIG. 14 is a block diagram illustrating the creation of a new copy-on-read blob due to a threshold associated with a second reference count being reached, according to an example embodiment.

For example, FIG. 14 is a block diagram illustrating the creation of a new copy-on-read blob due to the threshold associated with the second reference count being reached in accordance with an embodiment. As shown in FIG. 14, copy-on-read blob 1402 is created because the second reference count has reached the threshold. As further shown in FIG. 14 responsive to receiving a copy request to create a new link blob, link blob 1404 is created, which is based on newly-created copy-on-read blob 1402. Subsequent copy requests to create link blobs will cause link blobs to be created based on copy-on-read blob 1402 until the second reference count associated with copy-on-read blob 1402 reaches the threshold.

As described above with reference to FIG. 5, front end server 216 may also cause table server 218 to create an index for copy-on-read blob 1402 and an index for the link blob 1404.

C. Deleting Blobs

In accordance with an embodiment, front end server 116 is configured to delete blobs responsive to receiving a delete request (e.g., via storage transaction interface 202). Responsive to receiving a delete request to delete a copy-on-read blob, front end server 116 causes each link blob created based on that copy-on-read blob to be copied with data that is stored by the copy-on-read blob and/or source blob, thereby enabling each of such link blob to be used as a source blob for other blobs. It is noted any write data stored by the link blob is preserved and not overwritten by data stored by the copy-on-read blob and/or the source blob.

Figure 15:
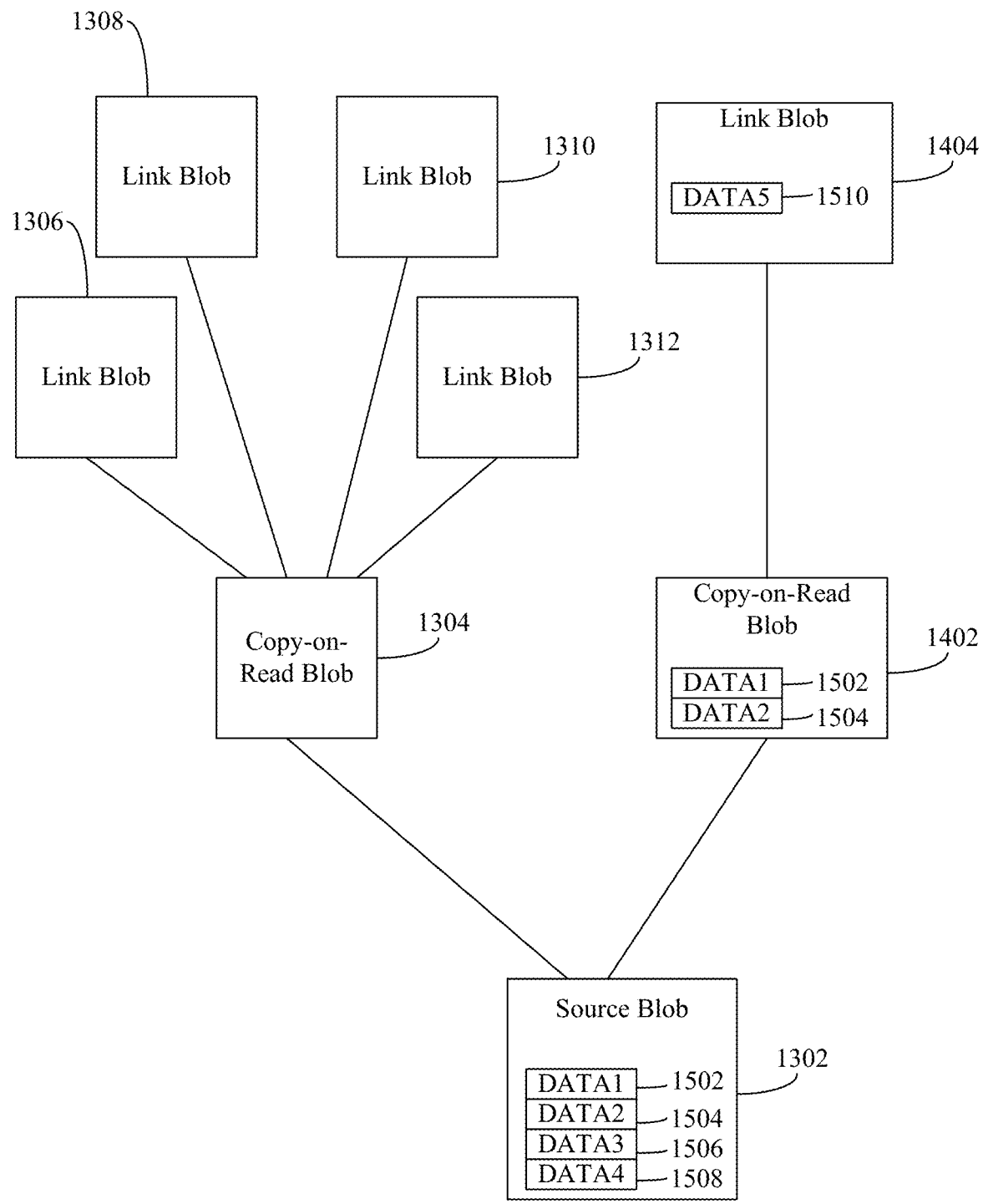
FIG. 15 is a block diagram illustrating data that is stored by a copy-on-read blob, a source blob and a link blob, according to an example embodiment.

For example, referring again to FIG. 14, suppose a delete request to delete copy-on-read blob 1402 is received by front end server 116. In this case, data stored by copy-on-read blob 1402 and source blob 1302 are copied to link blob 1404. For instance, FIG. 15 is a block diagram of illustrating data that is stored by copy-on-read blob 1402, source blob 1302 and link blob 1404 in accordance with an embodiment. As shown in FIG. 15, source blob 1302 comprises DATA1 1502, DATA2 1504, DATA3 1506 and DATA4 1508, copy-on-read blob 1402 comprises copies of DATA1 1502 and DATA2 1504 and link blob 1404 comprises DATA5 1510. DATA1 1502 and DATA2 1504 were copied to copy-on-read blob 1402 as a result of receiving read requests for that data from a virtual machine. DATA5 1510 was written to link blob as a result of a write request being issued to link blob 1404 from a virtual machine.

Upon front end server 116 receiving a delete request, front end server 116 may cause table server 118 to retrieve data for each logical unit associated with link blob 1404 for which data has not been written. For example, if DATA5 was written to a physical storage location corresponding to a first logical unit of the link blob and all other logical units) of the link blob are unmapped, table server 118 may copy data from logical units of copy-on-read blob 1404 and source blob 1302 corresponding to the other logical units. In the example shown in FIG. 15, such data includes DATA1 1502, DATA2 1504 and DATA4 1508. DATA3 1506 has been overwritten by DATA5 1510. Thus, DATA1 1502 and DATA2 1504 are copied from copy-on-read blob 1402 to link blob 1404, and DATA4 1508 from source blob 1302 is copied to link blob 1404. Copy-on-read blob 1402 may be deleted after data has been copied to link blob 1404.

Figure 16:
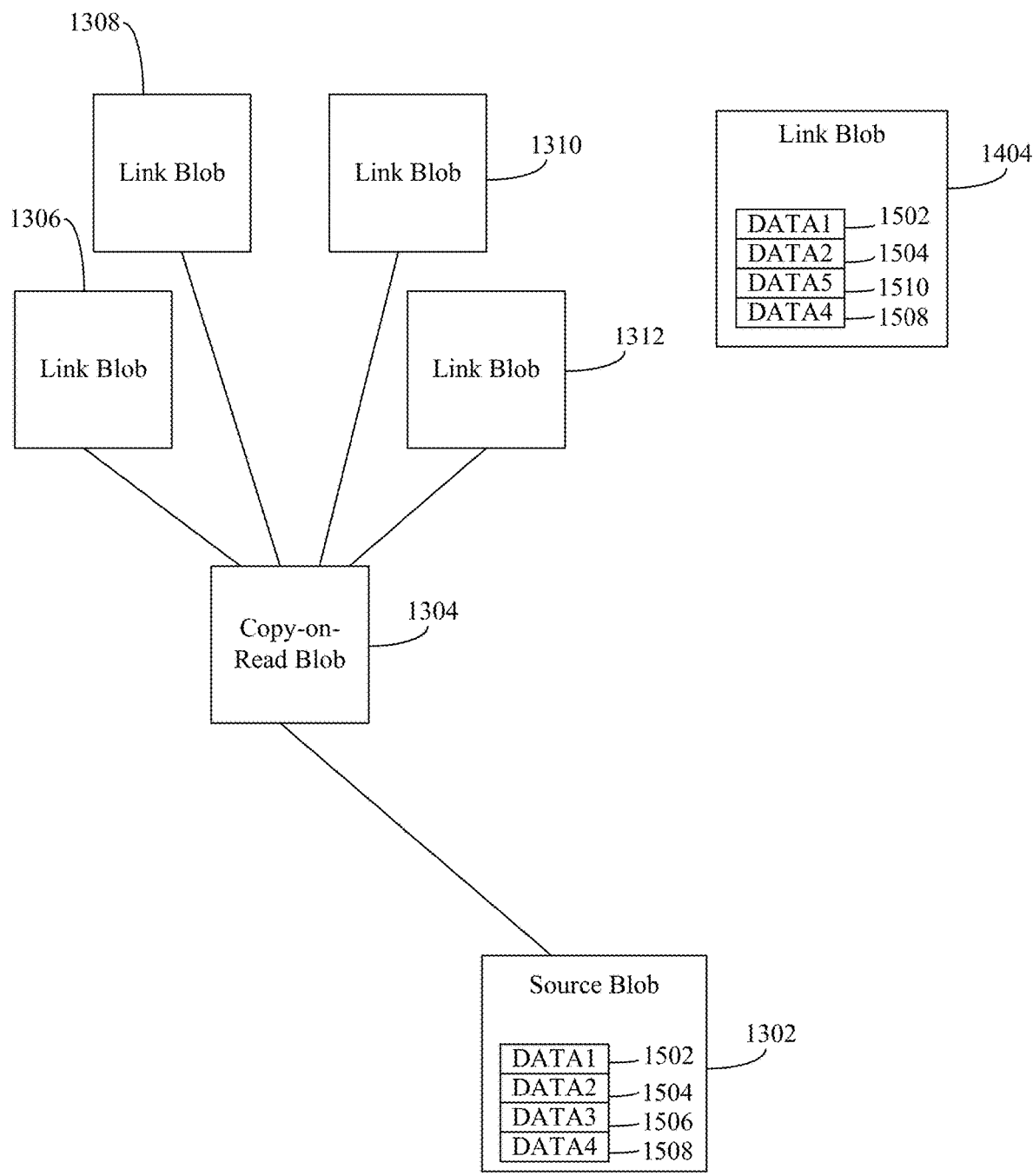
FIG. 16 is a block diagram illustrating a link blob after data has been copied thereto as a result from a request to delete a copy-on-read blob, according to an example embodiment.

FIG. 16 shows link blob 1404 after data has been copied thereto as a result from a delete request to delete copy-on-read blob 1402 in accordance with an embodiment. As shown in FIG. 16, DATA1 1502, DATA2 1504 and DATA4 1508 have been copied to link blob 1404 and DATA5 1510 has been preserved. Moreover, copy-on-read 1402 has been deleted, and therefore, not shown in FIG. 16. The index associated with link blob 1402 may also be updated to associate the logical units of link blob 1404 with pointers pointing to the physical storage locations at which DATA1', DATA2', DATA5, and DATA4 are stored. Because link blob 1404 now contains all the data stored by source blob 1302, link blob 1404 has effectively become a source blob, from which a copy-on-read blob may be created.

After copy-on-read blob 1402 is deleted, the first reference count associated with source blob 1302 may be decremented to reflect the decrease in the number of copy-on-read blobs that have been created based thereon. Moreover, the index associated with copy-on-read blob 1402 may be deleted.

In accordance with an embodiment, upon receiving a delete request for a copy-on-read blob, a temporary copy-on-read blob may be created based on the copy-on-read blob to be deleted. Once data from the original copy-on-read blob has been copied to the temporary copy-on-read blob, the original copy-on-read blob is deleted, and data from the temporary copy-on-read blob is copied to each link blob that was created based on the original copy-on-read blob. By creating the temporary copy-on-read blob, the original copy-on-read blob may be deleted sooner rather than later. That is, the original copy-on-read blob may be deleted as soon as its data has been copied to the temporary copy-on-read blob, rather than waiting for the data to be copied to each of the link blobs.

In accordance with another embodiment, rather than copying data from the copy-on-read blob to each link blob, the index associated with each link blob is updated to include the location information of the index associated with the copy-on-read blob (i.e., the pointers and/or remote identifiers associated with each logical unit of the copy-on-read blob). That is, each entry of the index associated with the link blob (for which no data has been written) is updated to point to the location at which the data is already located. In this way, only updates to the index associated with the link blob index are performed, rather than the actual copying of data, thereby optimizing the time for blob deletion and storage space. Moreover, instead of updating each index associated with a link blob, only a single index may be updated, and the single index may be shared among each link blob, thereby optimizing storage space.

Front end server 116 may be further configured to receive delete requests to delete a link blob. Upon receiving a delete request, table server 118 may delete the index associated with the link blob and front end server 116 may decrement the second reference count.

D. Copy-On-Read Blob Based on a Link Blob

Figure 17:
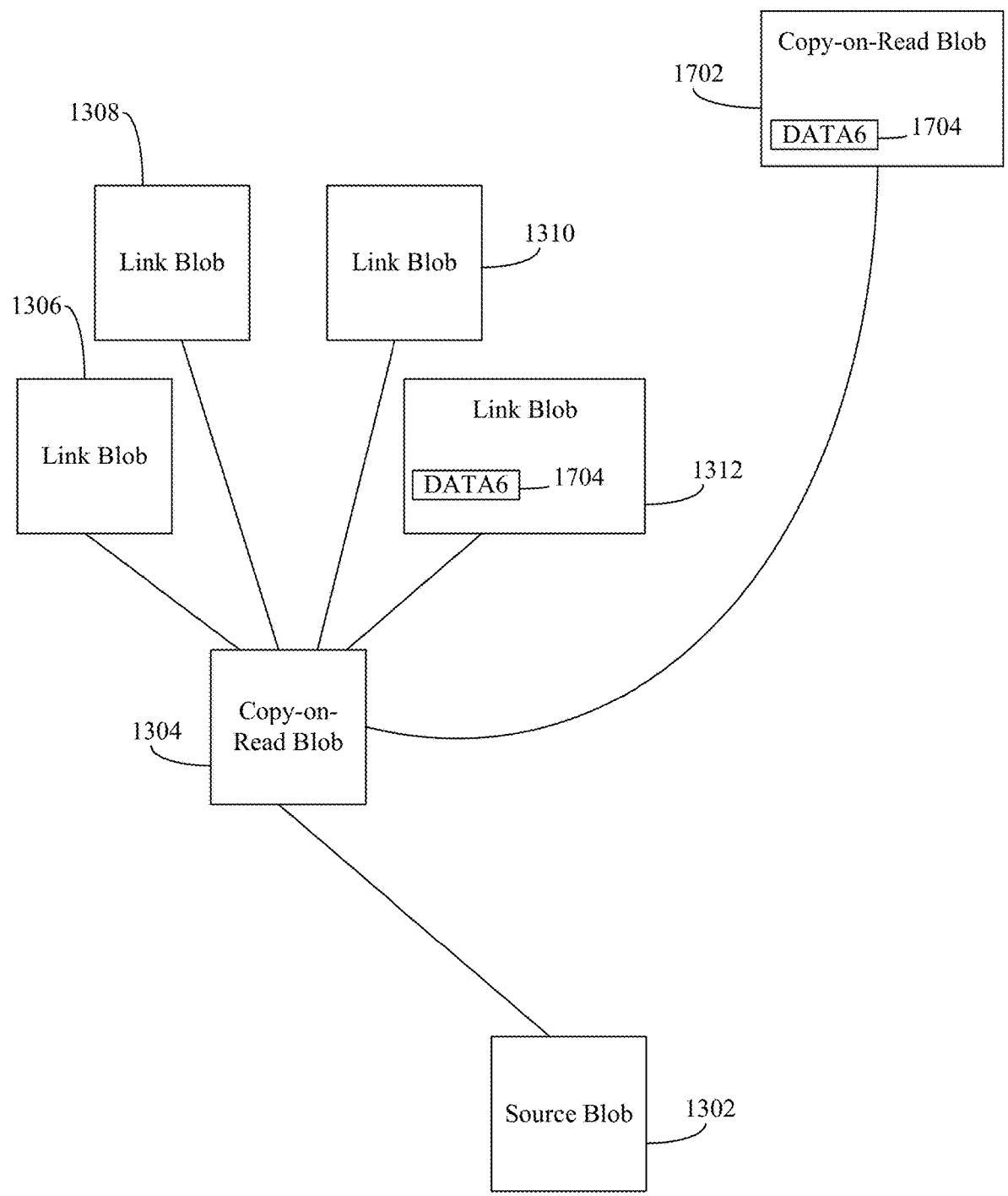
FIG. 17 is a block diagram illustrating is the creation of a copy-on-read blob based on a link blob, according to an example embodiment.

In accordance with an embodiment, a copy-on-read blob may be created based on a link blob. In accordance with such an embodiment, the copy-on-read blob references the copy-on-read blob on which the link blob is based, rather than the link blob. For example, referring again to FIG. 16, a copy request to create a new copy-on-blob based on link blob 1312 may be received (e.g., by front end server 116). In this case, the data stored by link blob 1312 is copied to the new copy-on-read blob and the new copy-on-read-blob references copy-on-read blob 1304. For example, FIG. 17 is a block diagram illustrating the creation of a copy-on-read blob based on a link blob in accordance with an embodiment. As shown in FIG. 17, link blob 1312 has DATA6 1704 written thereto. Response to receiving a copy request to create copy-on-read blob 1702, table server 118 may copy DATA6 1704 to copy-on-read blob 1702. Table server 118 also creates an index for copy-on-read blob 1702. For logical units for which data has not been copied to copy-on-read blob 1702, the index associates a remote identifier that references copy-on-read blob 1304 (and not link blob 312) from which data is to be retrieved.

After creating copy-on-read blob 1702, additional link blobs may be created based thereon.

E. Backfilling Polices

In accordance with an embodiment, a copy-on-read blob may be backfilled with data from stored by the source blob it references as a background process. By doing so, the copy-on-read blob will eventually contain all the data contained by the source blob over time. Different policies may be used to backfill a copy-on-read blob. One policy is to begin backfilling a copy-on-read blob immediately after creation. This policy may be used for copy-on-read blobs that are based on source blobs that are normally replicated across different geographical regions and/or across clusters.

Another policy is to begin backfilling a copy-on-read blob upon receiving the first read request for data. Placing such a condition on backfilling advantageously preserves computing resources (e.g., processing, network bandwidth, storage) in the event that the copy-on-read blob is never used. Yet another policy is to begin backfilling after an N number of read requests are received (where N is any integer greater than 1) or after an M number of bytes have been read from the source blob (where M is any positive integer). This policy effectively creates a threshold that is used to determine whether or not a copy-on-read blob should be backfilled. The effective threshold can be used to determine whether or not a copy-on-read blob is frequently used. In response to determining that the copy-on-read blob is frequently used, the copy-on-read blob is backfilled. The effective threshold may be based on the number of read requests received and/or the number of bytes read during the lifetime of the source blob or for a particular time period of the source blob's existence. The effective threshold may also be based on a moving average of the number of read requests received and/or the number of bytes read within one or more periods of time.

In accordance with an embodiment, the backfilling policy being used may be provided to and/or designated by a user or blob management entity 124. For example, blob management entity 124 may provide a request to obtain the backfilling policy being implemented and/or designate the backfilling policy to be implement via an API. In another example, a user may interact with a graphical user interface (GUI) to issue a request to retrieve and/or designate the backfilling policy.

IV. Example Computer System Implementation

Clusters 102A-102N, nodes 104A-104N, nodes 108A-108N, nodes 112A-112N, storage node(s) 110, virtual machine 114, blob management entity 124, front end server 116, table server 118, front end server 216, table server 218, storage transaction interface 202, storage node 210, flowchart 1000, flowchart 1100 and/or flowchart 1200 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 18:
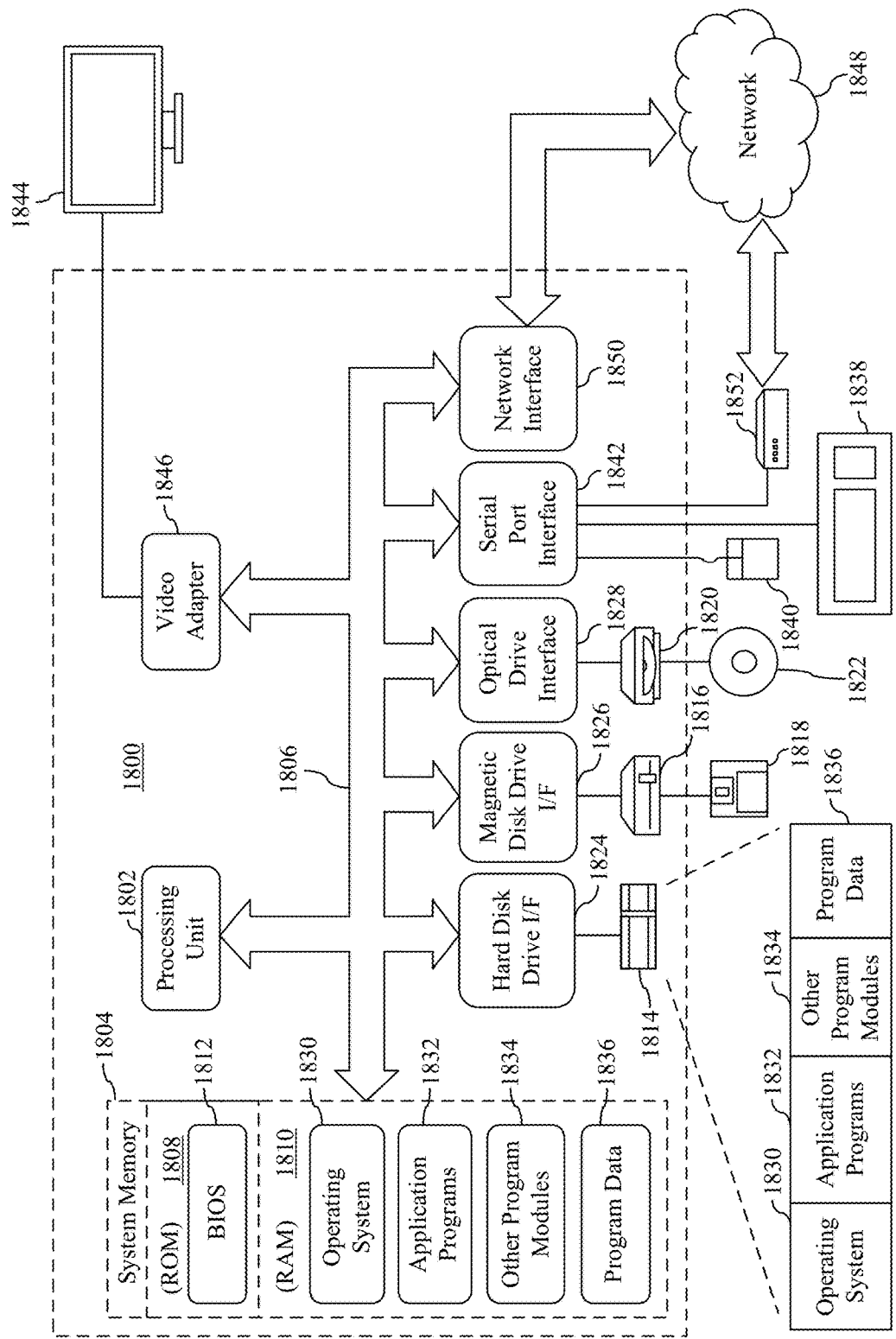
FIG. 18 is a block diagram of an example processor-based computer system that may be used to implement various embodiments.

FIG. 18 depicts an example processor-based computer system 1800 that may be used to implement various embodiments described herein. For example, system 1800 may be used to implement clusters 102A-102N, nodes 104A-104N, nodes 108A-108N, nodes 112A-112N, storage node(s) 110, and storage node 210 as described above in reference to FIGS. 1 and 3-9. System 1800 may also be used to implement any of the steps of any of the flowcharts of FIGS. 10-12, as described above. The description of system 1800 provided herein is provided for purposes of illustration, and is not intended to be limiting. Embodiments may be implemented in further types of computer systems, as would be known to persons skilled in the relevant art(s).

As shown in FIG. 18, system 1800 includes a processing unit 1802, a system memory 1804, and a bus 1806 that couples various system components including system memory 1804 to processing unit 1802. Processing unit 1802 may comprise one or more circuits (e.g. processor circuits), microprocessors or microprocessor cores. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

System 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, BLU-RAY™ disk or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1830, one or more application programs 1832, other program modules 1834, and program data 1836. In accordance with various embodiments, the program modules may include computer program logic that is executable by processing unit 1802 to perform any or all of the functions and features of clusters 102A-102N, nodes 104A-104N, nodes 108A-108N, nodes 112A-112N, storage node(s) 110, and storage node 210 as described above in reference to FIGS. 1 and 3-9. The program modules may also include computer program logic that, when executed by processing unit 1802, causes processing unit 1802 to perform any of the steps of any of the flowcharts of FIGS. 10-12, as described above.

A user may enter commands and information into system 1800 through input devices such as a keyboard 1838 and a pointing device 1840 (e.g., a mouse). Other input devices (not shown) may include a microphone, joystick, game controller, scanner, or the like. In one embodiment, a touch screen is provided in conjunction with a display 1844 to allow a user to provide user input via the application of a touch (as by a finger or stylus for example) to one or more points on the touch screen. These and other input devices are often connected to processing unit 1802 through a serial port interface 1842 that is coupled to bus 1806, but may be connected by other interfaces, such as a parallel port, game port, or a universal serial bus (USB). Such interfaces may be wired or wireless interfaces.

Display 1844 is connected to bus 1806 via an interface, such as a video adapter 1846. In addition to display 1844, system 1800 may include other peripheral output devices (not shown) such as speakers and printers.

System 1800 is connected to a network 1848 (e.g., a local area network or wide area network such as the Internet) through a network interface 1850, a modem 1852, or other suitable means for establishing communications over the network. Modem 1852, which may be internal or external, is connected to bus 1806 via serial port interface 1842.

As used herein, the terms "computer program medium," "computer-readable medium," and "computer-readable storage medium" are used to generally refer to memory devices or storage structures such as the hard disk associated with hard disk drive 1814, removable magnetic disk 1818, removable optical disk 1822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1832 and other program modules 1834) may be stored on the hard disk, magnetic disk, optical disk, ROM, or RAM. Such computer programs may also be received via network interface 1850, serial port interface 1842, or any other interface type. Such computer programs, when executed or loaded by an application, enable system 1800 to implement features of embodiments discussed herein. Accordingly, such computer programs represent controllers of the system 1800. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Example Embodiments

In one embodiment, a method performed by a storage system comprises: receiving a first copy request to create a copy-on-read blob based on a source blob; in response to receiving the first copy request, creating an index for the copy-on-read blob; receiving a first read request that identifies one or more first logical units of the copy-on-read blob; in response to receiving the first read request, for each first logical unit of the copy-on-read blob identified by the first read request: determining whether the index for the copy-on-read blob associates the first logical unit of the copy-on-read blob with a physical storage location that was previously assigned to the copy-on-read blob; in response to determining that the index for the copy-on-read blob does not associate the first logical unit of the copy-on-read blob with a physical storage location that was previously assigned to the copy-on-read blob: copying first data from a corresponding logical unit of the source blob to a physical storage location that is newly assigned to the copy-on-read blob; updating the first index to associate the first logical unit with the physical storage location that is newly assigned to the copy-on-read blob; and returning the first data copied from the corresponding logical unit of the source blob in response to the first read request; and in response to determining that the index for the copy-on-read blob associates the first logical unit of the copy-on-read blob with a physical storage location that was previously assigned to the copy-on-read blob, retrieving second data stored at the physical storage location that was previously assigned to the copy-on-read blob and returning the retrieved second data in response to the first read request.

In an embodiment, the method further comprises: receiving a second copy request to create a link blob based on the copy-on-read blob; in response to receiving the second copy request, creating an index for the link blob; receiving a write request that identifies one or more second logical units of the link blob; and in response to receiving the write request, for each second logical unit identified by the write request: determining a physical storage location associated with the link blob at which third data associated with the write request is to be stored; storing the third data associated with the write request at the physical storage location associated with the link blob; and updating the index for the link blob to associate the second logical unit with the physical storage location associated with the link blob at which the third data is stored.

In an embodiment, the method further comprises: receiving a second read request that identifies one or more third logical units of the link blob; and in response to receiving the second read request, for each third logical unit of the link blob identified by the second read request: determining whether the index for the link blob associates the third logical unit of the link blob with a physical storage location that was previously assigned to the link blob; in response to determining that the index for the link blob does not associate the third logical unit of the link blob with a physical storage location that was previously assigned to the link blob, retrieving fifth data from a corresponding logical unit of the copy-on-read blob or the source blob and returning the retrieved fifth data in response to the second read request; and in response to determining that the index for the link blob associates the third logical unit of the link blob with a physical storage location that was previously assigned to the link blob, retrieving sixth data stored at the physical storage location that was previously assigned to the link blob and returning the retrieved sixth data in response to the second read request.

In an embodiment, the method further comprises: for each received first copy request, incrementing a first reference count, the first reference count being indicative of a number of copy-on-read blobs created based on the source blob; for each received second copy request, incrementing a second reference count, the second reference count being indicative of a number of link blobs created based on the copy-on-read blob; and for each received copy request to create a new copy-on-read blob based on the copy-on-read blob, incrementing a third reference count, the third reference count being indicative of a number of copy-on-read blobs created based on the copy-on-read blob.

In an embodiment, the method further comprises: determining that the second reference count has reached a threshold; in response to determining that the second reference count has reached the threshold, creating a second copy-on-read blob based on the source blob; and creating one or more additional link blobs based on the second copy-on-read blob.

In an embodiment, the method further comprises: providing an interface via which the threshold may be specified by a user or a software entity.

In an embodiment, the method further comprises: providing an interface via which the reference count may be returned to a user or a software entity to facilitate load balancing.

In an embodiment, the method further comprises: receiving a delete request to delete the copy-on-read blob; and in response to receiving the delete request, for each link blob that was created based on the copy-on-read blob: for each logical unit of the link blob for which data has not been written, causing data stored at a corresponding logical unit of one or more of the copy-on-read blob or the source blob to be copied to physical storage associated with the link blob.

In an embodiment, at least one of the first copy request or the second copy request is received via an application programming interface.

In an embodiment, the method further comprises: providing an interface via which a data dependency graph may be returned to a user or a software entity, the data dependency graph describing a first relationship between the source blob and each copy-on-read blob created based thereon and, for each copy-on-read blob created based on the source blob, a second relationship between the copy-on-read blob and each link blob created based on the copy-on-read blob.

In an embodiment, the method further comprises: copying unread data from the source blob to the copy-on-read blob in accordance with one or more policies, said policies comprising at least one or more of: copying the unread data after creation of the copy-on-read blob; copying the unread data responsive to receiving the first read request; or copying the unread data responsive to one or more of: receiving an N number of first read requests, where N is any integer greater than 1; or an M number of bytes of data being read from the source blob, where M is any positive integer.

In an embodiment, the method further comprises: receiving a third copy request to create a second copy-on-read blob based on the link blob; and in responsive to receiving the third copy request, copying data stored at one or more physical storage locations that were previously assigned to the link blob to one or more physical storage locations assigned to the second copy-on-read blob.

In an embodiment, a storage system comprises: one or more servers, each of the one or more servers comprising at least one processor circuit and a memory that stores instructions for execution by the at least one processor circuit to configure the one or more servers to perform operations, the one or more servers being configured to: receive a first copy request to create a copy-on-read blob based on a source blob; in response to receiving the first copy request, create an index for the copy-on-read blob; receive a first read request that identifies one or more first logical units of the copy-on-read blob; in response to receiving the first read request, for each first logical unit of the copy-on-read blob identified by the first read request: determine whether the index for the copy-on-read blob associates the first logical unit of the copy-on-read blob with a physical storage location that was previously assigned to the copy-on-read blob; in response to determining that the index for the copy-on-read blob does not associate the first logical unit of the copy-on-read blob with a physical storage location that was previously assigned to the copy-on-read blob: copy second data from a corresponding logical unit of the source blob to a physical storage location that is newly assigned to the copy-on-read blob; update the first index to associate the first logical unit with the physical storage location that is newly assigned to the copy-on-read blob; and return the second data copied from the corresponding logical unit of the source blob in response to the first read request; and in response to determining that the index for the copy-on-read blob associates the first logical unit of the copy-on-read blob with a physical storage location that was previously assigned to the copy-on-read blob, retrieve first data stored at the physical storage location that was previously assigned to the copy-on-read blob and return the retrieved first data in response to the first read request.

In an embodiment, the one or more servers are further configured to: receive a second copy request to create a link blob based on the copy-on-read blob; in response to receiving the second copy request, create an index for the link blob; receive a write request that identifies one or more second logical units of the link blob; and in response to receiving the write request, for each second logical unit identified by the write request: determine a physical storage location associated with the link blob at which third data associated with the write request is to be stored; store the third data associated with the write request at the physical storage location associated with the link blob; and update the index for the link blob to associate the second logical unit with the physical storage location associated with the link blob at which the third data is stored.

In an embodiment, the one or more servers are further configured to: receive a second read request that identifies one or more third logical units of the link blob; and in response to receiving the second read request, for each third logical unit of the link blob identified by the second read request: determine whether the index for the link blob associates the third logical unit of the link blob with a physical storage location that was previously assigned to the link blob; in response to determining that the index for the link blob does not associate the third logical unit of the link blob with a physical storage location that was previously assigned to the link blob, retrieve fifth data from a corresponding logical unit of the copy-on-read blob or the source blob and return the retrieved fifth data in response to the second read request; and in response to determining that the index for the link blob associates the third logical unit of the link blob with a physical storage location that was previously assigned to the link blob, retrieve sixth data stored at the physical storage location that was previously assigned to the link blob and return the retrieved sixth data in response to the second read request.

In an embodiment, a method comprises: a computer-readable storage medium having program instructions recorded thereon that, when executed by at least one processing circuit, perform a method on a storage system comprising one or more servers, the method comprises: receiving a first copy request to create a copy-on-read blob based on a source blob; in response to receiving the first copy request, creating an index for the copy-on-read blob; receiving a first read request that identifies one or more first logical units of the copy-on-read blob; in response to receiving the first read request, for each first logical unit of the copy-on-read blob identified by the first read request: determining whether the index for the copy-on-read blob associates the first logical unit of the copy-on-read blob with a physical storage location that was previously assigned to the copy-on-read blob; in response to determining that the index for the copy-on-read blob does not associate the first logical unit of the copy-on-read blob with a physical storage location that was previously assigned to the copy-on-read blob: copying first data from a corresponding logical unit of the source blob to a physical storage location that is newly assigned to the copy-on-read blob; updating the first index to associate the first logical unit with the physical storage location that is newly assigned to the copy-on-read blob; and returning the first data copied from the corresponding logical unit of the source blob in response to the first read request; and in response to determining that the index for the copy-on-read blob associates the first logical unit of the copy-on-read blob with a physical storage location that was previously assigned to the copy-on-read blob, retrieving second data stored at the physical storage location that was previously assigned to the copy-on-read blob and returning the retrieved second data in response to the first read request.

In an embodiment, the method further comprises: receiving a second copy request to create a link blob based on the copy-on-read blob; in response to receiving the second copy request, creating an index for the link blob; receiving a write request that identifies one or more second logical units of the link blob; and in response to receiving the write request, for each second logical unit identified by the write request: determining a physical storage location associated with the link blob at which third data associated with the write request is to be stored; storing the third data associated with the write request at the physical storage location associated with the link blob; and updating the index for the link blob to associate the second logical unit with the physical storage location associated with the link blob at which the third data is stored.

In an embodiment, the method further comprises: for each received second copy request, incrementing a reference count, the reference count being indicative of a number of link blobs created.

In an embodiment, the method further comprises: receiving a delete request to delete the link blob; and decrementing the reference count upon deletion of the link blob.

In an embodiment, the source blob comprises a read-only operating system image.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a storage system, comprising:
receiving a first read request for first data;
determining whether the first data is retrievable via a copy-on-read blob created based on a source blob;
in response to determining that the first data is retrievable via the copy-on-read blob, returning the first data via the copy-on read blob in response to the first read request; and
in response to determining that the first data is not retrievable via the copy-on-read blob:
retrieving the first data via the source blob;
copying the first data to a location associated with the copy-on-read blob; and
returning the first data copied to the location in response to the first read request.

2. The method of claim 1, further comprising:
receiving a write request that is associated with a link blob that is created based on the copy-on-read blob; and
storing second data associated with the write request to a location associated with the link blob.

3. The method of claim 2, further comprising:
receiving a second read request for third data;
determining whether the third data is retrievable via the link blob;
in response to determining that the third data is not retrievable via the link blob, returning the third data from the copy-on-read blob or the source blob in response to the second read request; and
in response to determining that the third data is retrievable via the link blob, returning the third data via the link blob.

4. The method of claim 2, wherein copy-on-read blobs are created based on receiving first copy requests, and wherein link blobs are created based on receiving second copy requests, the method further comprising:
for each received first copy request, incrementing a first reference count, the first reference count being indicative of a number of copy-on-read blobs created based on the source blob; and
for each received second copy request, incrementing a second reference count, the second reference count being indicative of a number of link blobs created based on the copy-on-read blob.

5. The method of claim 4, further comprising:
determining that the second reference count has reached a threshold;
in response to determining that the second reference count has reached the threshold, creating a second copy-on-read blob based on the source blob; and
creating one or more additional link blobs based on the second copy-on-read blob.

6. The method of claim 5, further comprising:
providing an interface via which the threshold may be specified by a user or a software entity.

7. The method of claim 4, further comprising:
providing an interface via which the first reference count may be returned to a user or a software entity to facilitate load balancing.

8. The method of claim 2, further comprising:
receiving a delete request to delete the copy-on-read blob; and
in response to receiving the delete request, for each link blob that was created based on the copy-on-read blob:
causing data stored via the copy-on-read blob or the source blob that has not been associated with the link blob to be copied to one or more locations associated with the link blob.

9. The method of claim 2, wherein at least one of the first copy requests or the second copy requests are received via an application programming interface.

10. The method of claim 2, further comprising:
providing an interface via which a data dependency graph may be returned to a user or a software entity, the data dependency graph describing a first relationship between the source blob and each copy-on-read blob created based thereon and, for each copy-on-read blob created based on the source blob, a second relationship between the copy-on-read blob and each link blob created based on the copy-on-read blob.

11. The method of claim 2, further comprising:
receiving a copy request to create a second copy-on-read blob based on the link blob; and in responsive to receiving the copy request, copying data locations that are associated with the link blob to locations associated with the second copy-on-read blob.

12. The method of claim 1, further comprising:
copying unread data from the source blob to the copy-on-read blob in accordance with one or more policies, said policies comprising at least one or more of:
copying the unread data after creation of the copy-on-read blob;
copying the unread data responsive to receiving the first read request; or
copying the unread data responsive to one or more of:
receiving an N number of first read requests, where N is any integer greater than 1; or
an M number of bytes of data being read from the source blob, where M is any positive integer.

13. A storage system, comprising:
one or more servers, each of the one or more servers comprising at least one processor circuit and a memory that stores instructions for execution by the at least one processor circuit to configure the one or more servers to perform operations, the one or more servers being configured to:
receive a first read request for first data;
determine whether the first data is retrievable via a copy-on-read blob created based on a source blob;
in response to determining that the first data is retrievable via the copy-on-read blob, return the first data via the copy-on read blob in response to the first read request; and
in response to determining that the first data is not retrievable via the copy-on-read blob:
retrieve the first data via the source blob;
copy the first data to a location associated with the copy-on-read blob; and
return the first data copied to the location in response to the first read request.

14. The storage system of claim 13, the one or more servers being further configured to:
receive a write request that is associated with a link blob that is created based on the copy-on-read blob; and
store second data associated with the write request to a location associated with the link blob.

15. The storage system of claim 14, the one or more servers being further configured to:
receive a second read request for third data;
determine whether the third data is retrievable via the link blob;
in response to determining that the third data is not retrievable via the link blob, return the third data from the copy-on-read blob or the source blob in response to the second read request; and
in response to determining that the third data is retrievable via the link blob, return the third data via the link blob.

16. A computer-readable storage medium having program instructions recorded thereon that, when executed by at least one processing circuit, perform a method on a storage system comprising one or more servers, the method comprising:
receiving a first read request for first data;
determining whether the first data is retrievable via a copy-on-read blob created based on a source blob;
in response to determining that the first data is retrievable via the copy-on-read blob, returning the first data via the copy-on read blob in response to the first read request; and
in response to determining that the first data is not retrievable via the copy-on-read blob:
retrieving the first data via the source blob;
copying the first data to a location associated with the copy-on-read blob; and
returning the first data copied to the location in response to the first read request.

17. The computer-readable storage medium of claim 16, the method further comprising:
receiving a write request that is associated with a link blob that is created based on the copy-on-read blob; and
storing second data associated with the write request to a location associated with the link blob.

18. The computer-readable storage medium of claim 17, wherein copy-on-read blobs are created based on receiving first copy requests, the method further comprising:
for each received first copy request, incrementing a reference count, the reference count being indicative of a number of copy-on-read blobs created based on the source blob.

19. The computer-readable storage medium of claim 18, the method further comprising:
receiving a delete request to delete the link blob; and
decrementing the reference count upon deletion of the link blob.

20. The computer-readable storage medium of claim 16, wherein the source blob comprises a read-only operating system image.

* * * * *